United States Patent
Yahagi et al.

(10) Patent No.: US 11,614,630 B2
(45) Date of Patent: *Mar. 28, 2023

(54) WEARABLE DEVICE, BATTERY USED IN THE SAME, AND POWER SUPPLY SYSTEM

(71) Applicant: MAXELL, LTD., Kyoto (JP)

(72) Inventors: Yasuo Yahagi, Tokyo (JP); Takatoshi Shirosugi, Tokyo (JP); Hitoshi Akiyama, Kyoto (JP); Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,155

(22) Filed: Feb. 11, 2022

(65) Prior Publication Data

US 2022/0166258 A1    May 26, 2022

Related U.S. Application Data

(63) Continuation of application No. 16/961,167, filed as application No. PCT/JP2019/001023 on Jan. 16, 2019, now Pat. No. 11,283,301.

(30) Foreign Application Priority Data

Jan. 18, 2018    (JP) .............................. JP2018-006364

(51) Int. Cl.
*G02B 27/01* (2006.01)
*H02J 50/80* (2016.01)
(Continued)

(52) U.S. Cl.
CPC ....... *G02B 27/0176* (2013.01); *G02B 27/017* (2013.01); *H01M 50/20* (2021.01);
(Continued)

(58) Field of Classification Search
CPC .............. G02B 27/0176; G02B 27/017; G02B 2027/0178; H01M 50/20; H01M 10/46;
(Continued)

(56) References Cited

U.S. PATENT DOCUMENTS 9,332,940 B1 *   5/2016   Bolognia ............. A61B 5/6802
10,199,851 B2 *   2/2019   Hiroki ..................... H02J 7/342
(Continued)

FOREIGN PATENT DOCUMENTS

JP    2005-073350 A    3/2005
JP    2009-251068    10/2009
(Continued)

OTHER PUBLICATIONS

Notice of Allowance issued in U.S. Appl. No. 16/961,167, dated Nov. 15, 2021.
(Continued)

*Primary Examiner* — Jared Fureman
*Assistant Examiner* — Michael J Warmflash
(74) *Attorney, Agent, or Firm* — McDermott Will & Emery LLP

(57) ABSTRACT

An HMD includes first and second batteries mounted therein, and includes a plurality of power receivers that receive power from the first and second batteries by wireless transmission, a power supply manager that monitors states of the first and second batteries, a communication interface that performs wireless communication with the first and second batteries, and a plurality of limiters that limit the power received by the plurality of power receivers. A controller causes the limiters to limit power, which is supplied to a load, according to a power use state of the load in the device, and the power supply manager acquires information of remaining power storage amounts of the first and second batteries through the communication interface
(Continued)

and displays the acquired information on a display. Therefore, since it is possible to supply power required for driving the device while wearing the HMD, the HMD can be continuously used.

15 Claims, 21 Drawing Sheets

(51) Int. Cl.
*H02J 50/90* (2016.01)
*H02J 50/12* (2016.01)
*H02J 50/40* (2016.01)
*H02J 7/00* (2006.01)
*H01M 50/20* (2021.01)
*H02J 50/10* (2016.01)

(52) U.S. Cl.
CPC ........ *H02J 7/00034* (2020.01); *H02J 7/0042* (2013.01); *H02J 7/0048* (2020.01); *H02J 50/10* (2016.02); *H02J 50/12* (2016.02); *H02J 50/40* (2016.02); *H02J 50/80* (2016.02); *H02J 50/90* (2016.02); *G02B 2027/0178* (2013.01)

(58) Field of Classification Search
CPC ............. H01M 50/227; H01M 50/271; H01M 10/0436; H01M 10/441; H01M 10/488; H01M 2220/30; H02J 7/00034; H02J 7/0042; H02J 7/0048; H02J 50/10; H02J 50/12; H02J 50/40; H02J 50/80; H02J 50/90; Y02E 60/10
See application file for complete search history.

(56) References Cited

U.S. PATENT DOCUMENTS

| | | | | |
|---|---|---|---|---|
| 10,291,057 | B2* | 5/2019 | Deng | H02J 7/04 |
| 11,283,301 | B2* | 3/2022 | Yahagi | H02J 7/0042 |
| 2015/0115733 | A1* | 4/2015 | Sealy | H02J 7/0068 |
| | | | | 307/104 |
| 2015/0222141 | A1* | 8/2015 | Yamazaki | H02J 50/20 |
| | | | | 320/108 |
| 2016/0094079 | A1* | 3/2016 | Hiroki | H02J 50/10 |
| | | | | 320/108 |
| 2016/0291666 | A1* | 10/2016 | Hosoya | G06F 1/3212 |
| 2017/0116479 | A1* | 4/2017 | Ouchi | G06F 3/147 |
| 2018/0184042 | A1* | 6/2018 | Matsuda | G02B 27/0172 |
| 2020/0252602 | A1* | 8/2020 | Oonishi | G02B 27/017 |

FOREIGN PATENT DOCUMENTS

| | | |
|---|---|---|
| JP | 2015-061468 A | 3/2015 |
| JP | 2016-032213 | 3/2016 |
| JP | 2016-073196 A | 5/2016 |
| JP | 2016-189044 A | 11/2016 |

OTHER PUBLICATIONS

International Search Report issued in corresponding International Patent Application No. PCT/JP2019/001023, dated Apr. 9, 2019, with English translation.

* cited by examiner

F I G. 1
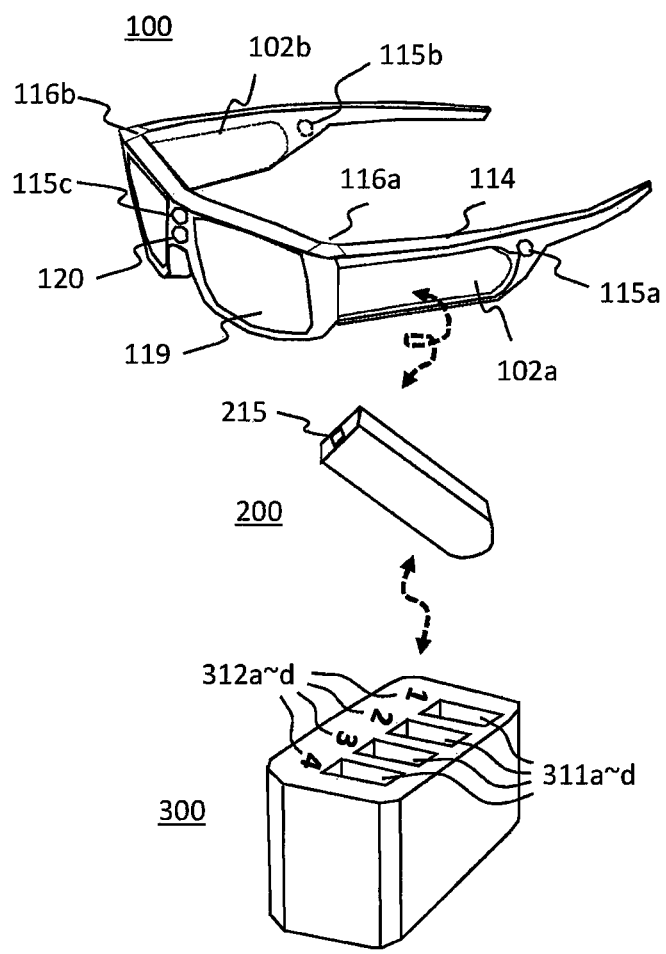

F I F. 1 2

FIG. 15
(a)
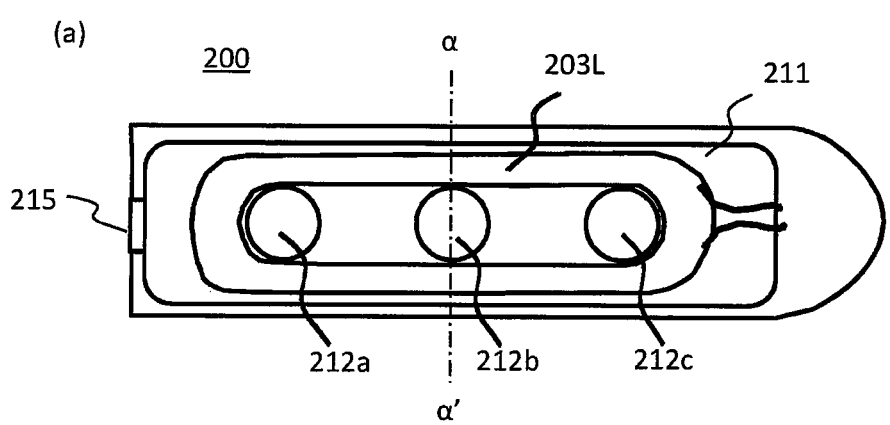
(b) α-α' CROSS SECTION
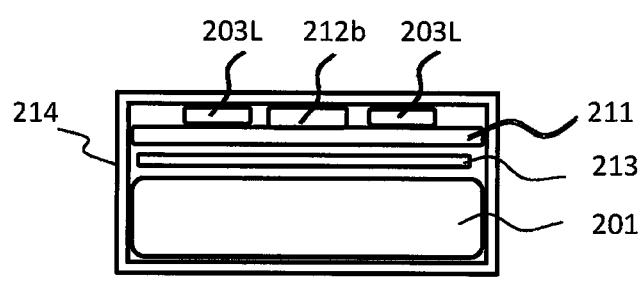

FIG. 16
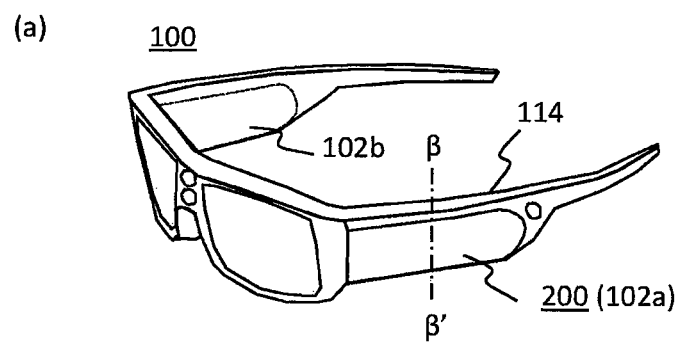
(a)
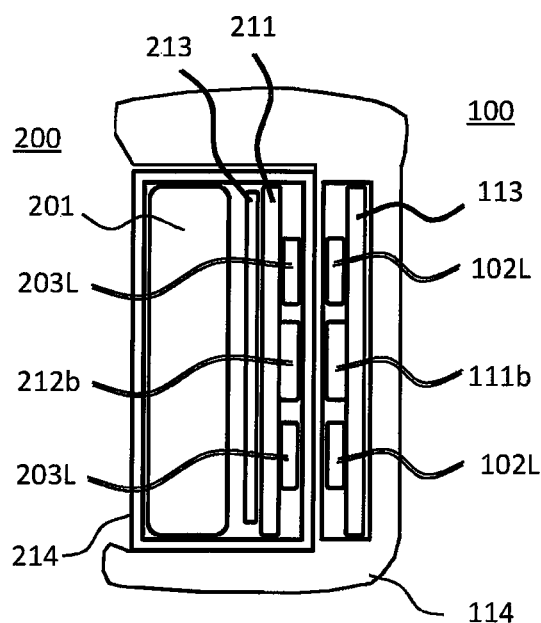
(b) β-β' CROSS SECTION
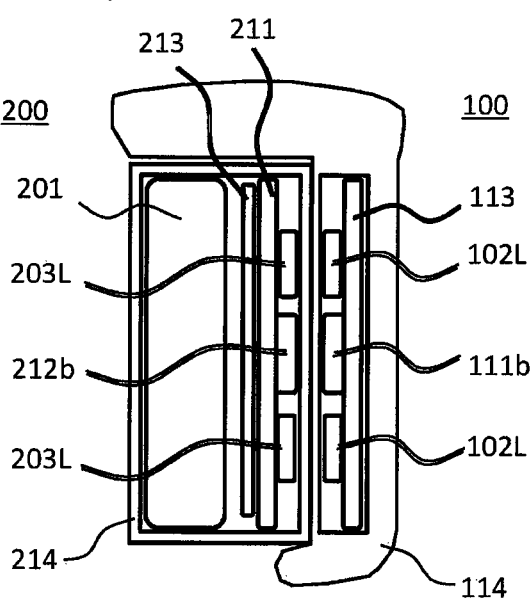
(c) β-β' CROSS SECTION FIG. 17
(a)
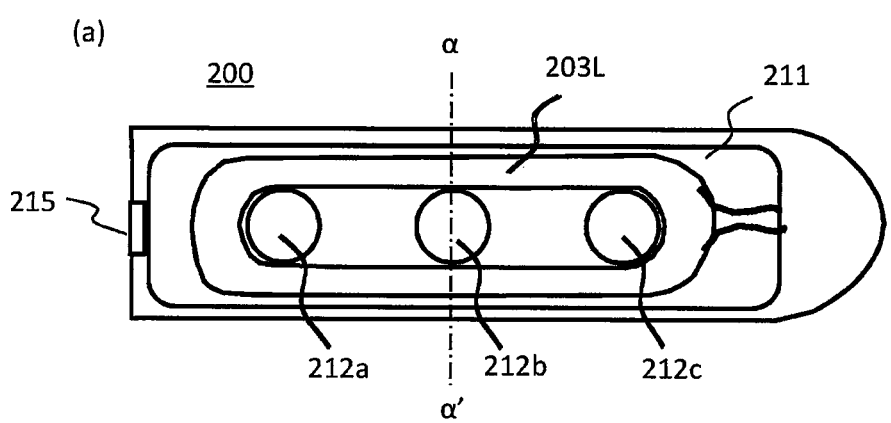
(b) α-α' CROSS SECTION
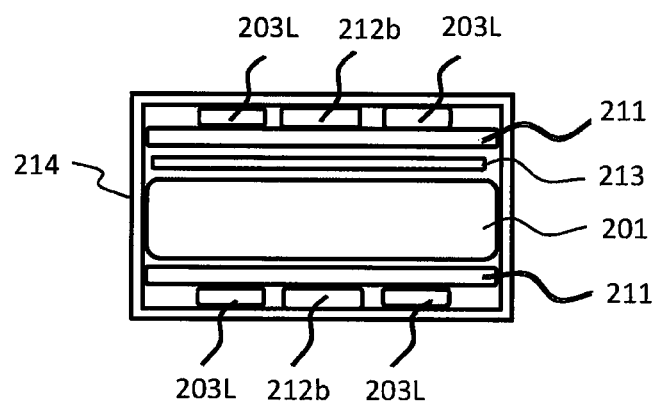

F I G. 1 8
(a)
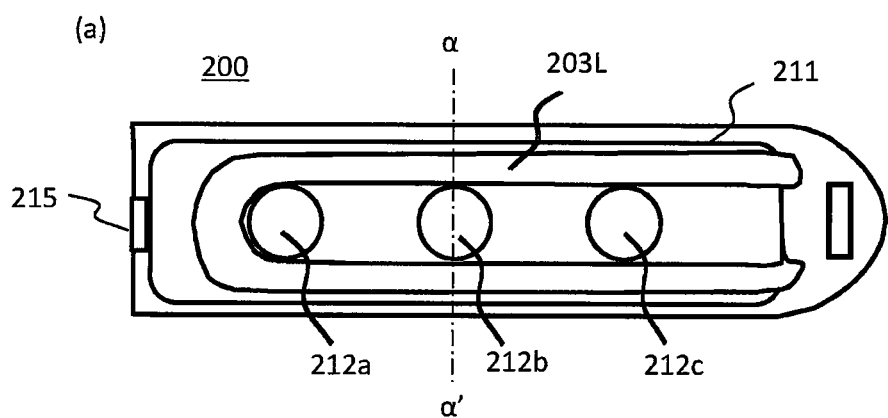
(b) α-α' CROSS SECTION
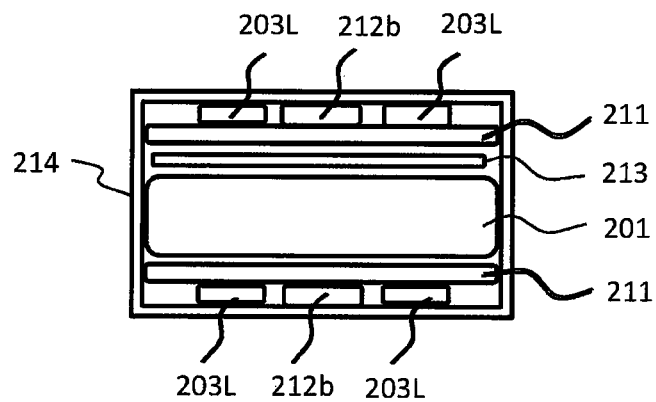

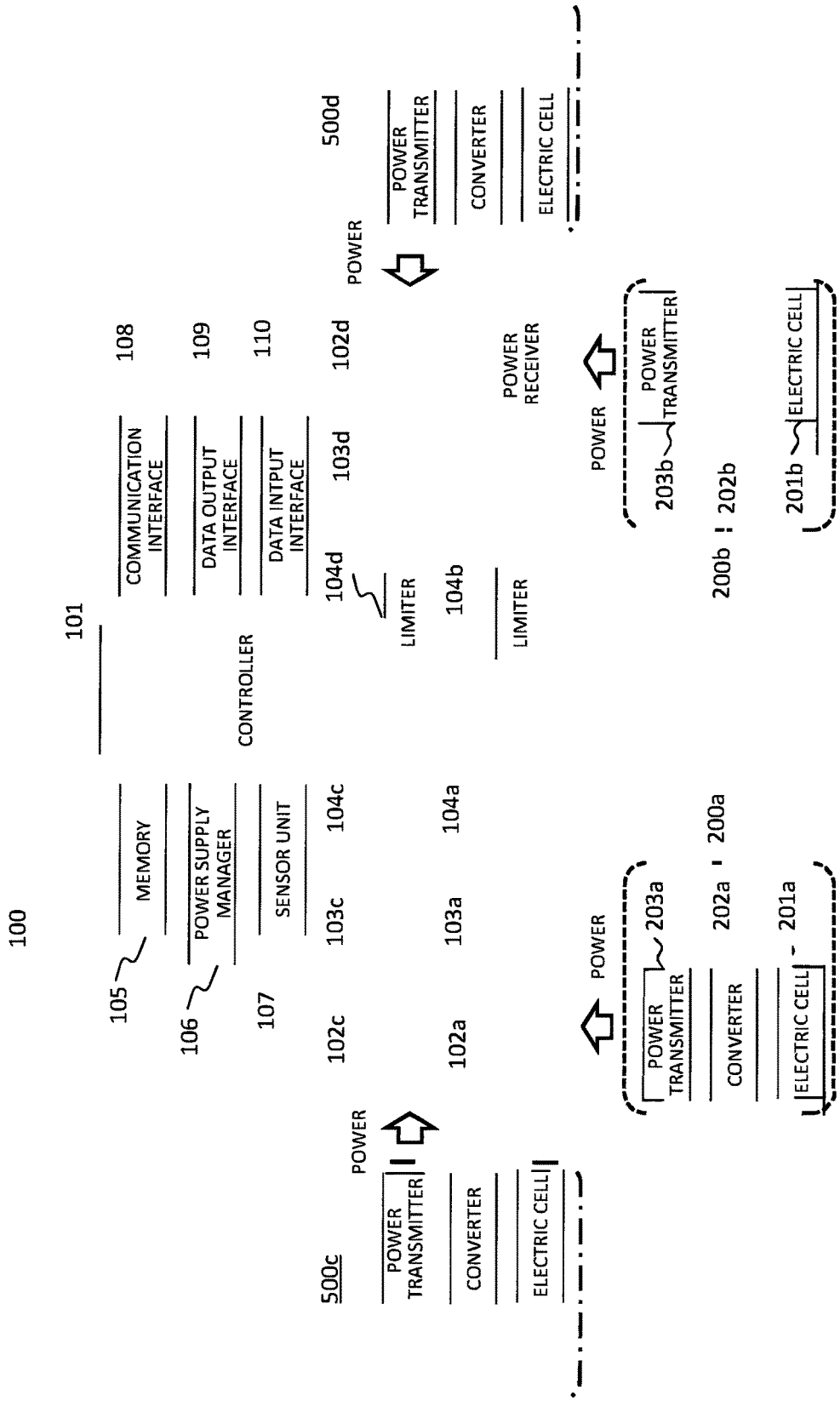

WEARABLE DEVICE, BATTERY USED IN THE SAME, AND POWER SUPPLY SYSTEM

CROSS-REFERENCE TO RELATED APPLICATIONS

This application is the Continuation of application Ser. No. 16/961,167, filed on Jul. 9, 2020, which is the U.S. National Phase under 35 U.S.C. § 371 of International Application No. PCT/JP2019/001023, filed on Jan. 16, 2019, which claims the benefit of Japanese Application No. 2018-006364, filed on Jan. 18, 2018, the entire contents of each are hereby incorporated by reference.

TECHNICAL FIELD

The present invention relates to a non-contact power transfer technique for a wearable device, such as a head mounted display (hereinafter, an HMD).

BACKGROUND ART

As a non-contact power transfer technique for a wearable device worn on the user's body to be used, the following techniques are known.

Patent Document 1 relates to electronic glasses having variable focus lenses and a charger therefor, and discloses a configuration in which a charger is inserted into a modern unit of electronic glasses and power is supplied from a power transmission coil of the charger to a power receiving coil of the electronic glasses by inductive coupling to charge a battery for driving the electronic glasses.

Patent Document 2 relates to a wearable device including a heater that warms an eye-front unit disposed in front of user's eyes, and discloses a configuration in which an electric wire wound around the eye-front unit is heated to warm the eye-front unit and the electric wire is a power receiving coil that receives a supply of power from an external power transmission coil in a non-contact manner.

Patent Document 3 relates to a power supply system from a secondary battery module to an electronic device (for example, a glasses-type device), and discloses a configuration in which a flexible secondary battery, a power transmitter that performs non-contact power transfer, and a flexible thermoelectric generator are housed in a belt unit of the secondary battery module and power is transmitted from the power transmitter of the secondary battery module to a power receiver of the electronic device by non-contact power transfer.

CITATION LIST

Patent Document

Patent Document 1: JP 2009-251068 A
Patent Document 2: JP 2016-032213 A
Patent Document 3: JP 2016-073196 A

SUMMARY OF THE INVENTION

Problems to be Solved by the Invention

The HMD in recent years has come to play a role as a wearable computer, a smartphone, or a tablet. In addition, a glasses-type transparent HMD is regarded as important as a core device for augmented reality (AR), and an immersive HMD is regarded as important as a core device for virtual reality (VR). HMDs may be used to enjoy movies or games.

However, since the power consumption increases as the functionality of the HMD increases, the usable time is insufficient with the conventional onboard battery capacity. Therefore, it is not possible to continue using the HMD while the HMD is being worn. During use, the HMD should be connected to an external power supply with a cable for the purpose of charging, or the use of the HMD should be interrupted to charge the battery. This is troublesome to the user. In order to continue using the HMD while the HMD is being worn, the capacity of the onboard battery may be increased, but the weight will increase accordingly. Particularly in the case of the glasses-type HMD, the weight of the device is applied to the user's ears or nose similarly to normal glasses. Therefore, the increase in weight should be suppressed as much as possible so as not to adversely affect the feeling of wearing. In addition, similarly to mobile devices, HMDs have become smaller and thinner, but cable connection at the time of charging or during use is troublesome. For this reason, there is an increasing demand for simple charging methods from users. As described above, it is an important issue of wearable devices always worn and used that the wearable device can be continuously used while the wearable device is being worn and the troublesomeness of cable connection is eliminated.

In the above Patent Document 1, in order to charge the battery for driving the electronic glasses, the user performs an operation of inserting the portable charger into the modern unit of the electronic glasses. However, the electronic glasses move when attaching or removing the portable charger, or the electronic glasses should be temporarily removed from the head, so that the use of the electronic glasses is temporarily interrupted. That is, it seems difficult for the user to continue using the electronic glasses while wearing the electronic glasses. In addition, Patent Document 1 describes a method in which a portable charger is connected to an external power supply for charging while being attached to the modern unit of the electronic glasses, but the problem of troublesomeness of cable connection remains. In addition, since the portable charger is connected to an external power supply by an external terminal, the portable charger has a terminal exposed to the outside. Therefore, when the portable charger is mounted on the head and used, there is a concern of short circuit or corrosion of the terminal due to sweat.

In the above Patent Document 2, it is described that the electric wire wound around the eye-front unit of the wearable device is a power receiving coil and receives a supply of power from the external power transmission coil in a non-contact manner. In this case, in order to receive a supply of desired power from the external power transmission coil, the power transmission coil and the power receiving coil should be close to each other. This is to suppress radio wave leakage to the surroundings within an allowable value during power transfer. As described in Patent Document 2, when electronic glasses are placed on a charging stand or the like so that the power transmission coil and the power receiving coil are close to each other, desired power transfer is possible. However, when the user wears and uses the wearable device, the external power transmission coil should be brought close to the eye-front unit (the position of the power receiving coil). This interferes with the field of view of the user using the wearable device. That is, it is expected that sufficient power cannot be supplied when the wearable device is worn by the user.

In the above Patent Document 3, the electronic device (glasses-type device) is configured to receive power from a belt-shaped secondary battery module mounted on the waist in a non-contact manner. Also in this case, it is expected that it is difficult to supply power required for the glasses-type device, such as the HMD, when the distance from the waist to the head of the user is taken into consideration. In addition, Patent Document 3 describes that the secondary battery can also be charged from a terminal unit through a cable. However, as described above, charging through the cable is troublesome for the user.

It is an object of the present invention, in view of the above problems of the related arts, to provide a wearable device that can receive a supply of power required for driving the device in a state in which the wearable device is worn and used, and therefore, causes less trouble for a user when using the wearable device.

Solutions to Problems

To give an example of the present invention, a wearable device includes: a plurality of power receivers in which at least first and second batteries are mounted and which receive power from the first and second batteries by wireless transmission; a power supply manager that monitors states of the mounted first and second batteries; a communication interface that performs wireless communication with the mounted first and second batteries; a display that provides information to the user; a plurality of limiters that limit the power received by the plurality of power receivers; and a controller that controls the power receivers, the power supply manager, the communication interface, the display, and the limiters. The controller causes the limiters to limit power, which is supplied to a load, according to a power use state of the load in the wearable device. The power supply manager acquires information of remaining power storage amounts of the mounted first and second batteries through the communication interface, and displays the acquired remaining power storage amount information on the display.

In addition, the plurality of limiters have a function of preventing a reverse current to the first and second battery sides. When the power supply manager determines that the remaining power storage amount of the first battery in use is smaller than a threshold, the controller controls the reverse current prevention function of the limiters to switch a power receiving system from the first battery in use to the second battery in standby and displays, on the display, a warning prompting the user to replace the first battery in use.

A battery of the present invention is mounted in a wearable device to supply power and is chargeable by a charger, and includes: an electric cell that stores power; a power transceiver that transmits power from the electric cell to the wearable device by wireless transmission and receives power from the charger by wireless transmission to charge the electric cell; a converter that performs conversion between a DC current and an AC current between the electric cell and the power transceiver; a power storage state controller that detects and stores a remaining power storage amount or power storage state information of the electric cell; a communication interface that performs wireless communication with the wearable device and the charger; and a controller that controls the power transceiver, the power storage state controller, and the communication interface. The power storage state controller transmits information of the remaining power storage amount of the electric cell to the wearable device through the communication interface, and transmits the power storage state information of the electric cell to the charger through the communication interface. The controller stops power transfer from the electric cell to the wearable device when a control command is received from the wearable device through the communication interface.

In addition, a power supply system of the present invention is configured to include: a wearable device; a battery that supplies power to the wearable device; and a charger that charges the battery. The wearable device includes: a plurality of power receivers in which at least first and second batteries are mounted and which receive power from the first and second batteries by wireless transmission; a power supply manager that monitors states of the mounted first and second batteries and a state of a third battery being charged by the charger; a communication interface that performs wireless communication with the mounted first and second batteries and the charger; and a display that provides information to a user. Each of the first to third batteries includes: a first electric cell that stores power; a power transceiver that transmits power from the first electric cell to the wearable device by wireless transmission and receives power from the charger by wireless transmission to charge the first electric cell; a power storage state controller that detects and stores a remaining power storage amount or power storage state information during charging of the first electric cell; and a communication interface that performs wireless communication with the wearable device and the charger. The charger includes: a second electric cell that stores power; a power transmitter that transmits power from the second electric cell to the third battery being charged by wireless transmission; a charging-battery monitor that acquires power storage state information of the third battery being charged; and a communication interface that performs wireless communication with the wearable device and the third battery. The wearable device displays, on the display, information of the remaining power storage amount acquired from each of the mounted first and second batteries and the power storage state information of the third battery being charged that is acquired from the charger. When it is determined that the remaining power storage amount of the first battery in use is smaller than a threshold, the wearable device switches power receiving system from the first battery in use to the second battery in standby and displays, on the display, a warning prompting the user to replace the first battery in use.

Effects of the Invention

According to the present invention, since it is possible to supply necessary power while the user is wearing the wearable device, the device can be continuously used. For example, even when the user watches a movie for a long time, the feeling of wearing is not adversely affected by increasing the number of batteries to be mounted, and there is no trouble of connecting a power supply cable from the terminal of the wearable device to the external power supply. Therefore, usability is improved.

BRIEF DESCRIPTION OF THE DRAWINGS

FIG. 1 is a diagram illustrating the overall configuration of a power supply system including an HMD, a battery, and a charger (first embodiment).

FIG. 15 is a diagram illustrating an example of the internal structure of a battery.

FIG. 16 is a diagram illustrating a state when a battery is mounted in the HMD.

FIG. 17 is a diagram illustrating another example of the internal structure of a battery.

FIG. 18 is a diagram illustrating a modification example of FIG. 17.

FIG. 20A is a diagram illustrating the configuration of a power supply system that supplies power from not only a battery but also a charger 500 to the HMD (fourth embodiment).

MODE FOR CARRYING OUT THE INVENTION

Figure 2:
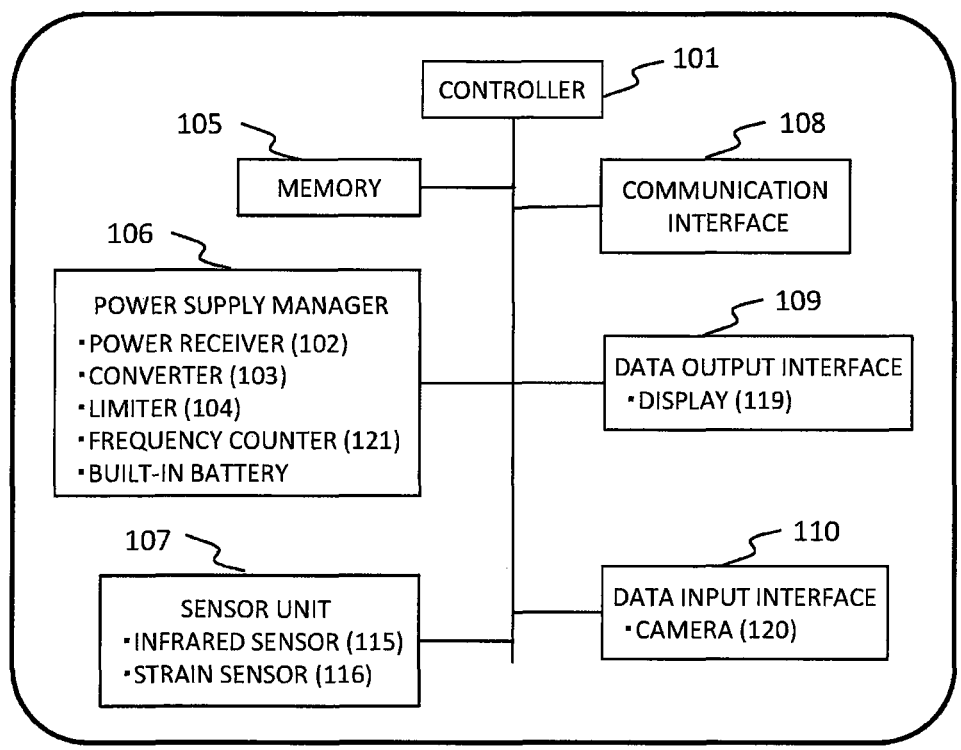
FIG. 2 is a block diagram illustrating the internal configuration of an HMD 100.

Hereinafter, embodiments of the present invention will be described in detail with reference to the diagrams. However, the present invention should not be construed as being limited to the description of the embodiments below. It is easily understood by those skilled in the art that the specific configuration can be changed without departing from the idea or the spirit of the present invention. In the configurations of the invention described below, the same portions or portions having the same function are denoted by the same reference numerals in different diagrams, and repeated descriptions thereof may be omitted.

First Embodiment

In a first embodiment, a basic configuration of power supply to a wearable device according to the present invention will be described. As an example of a wearable device worn on the user's body to be used, there is a glasses-type head mounted display (hereinafter, an HMD). The HMD includes a plurality of batteries mounted therein. When the power level of the battery in use is low, the battery is removed from the HMD and charged by a charger. While the battery is being charged, power is supplied to the HMD by switching to another battery that is on standby, so that the user can continue using the HMD. In this case, power is wirelessly (contactlessly) transmitted between the HMD and the battery and between the battery and the charger, and information, such as the power level or the charge amount of the battery, is transmitted through communication therebetween.

FIG. 1 is a diagram illustrating the overall configuration of a power supply system including an HMD 100, a battery 200, and a charger 300. First, the basic operation will be described. In the glasses-type HMD 100, power receivers 102a and 102b are provided in a symmetrical "temple" unit (temple unit 114) of the glasses, and two batteries 200a and 200b are mounted therein. Electric power is supplied from the batteries 200a and 200b to the power receivers 102a and 102b through power transceiving coil. Although two batteries are mounted herein, a plurality of (two or more) batteries may be undoubtedly used.

When the power level of one battery 200a is low due to using the HMD 100, a warning of low power level is displayed on a display 119 of the HMD 100. The user removes the battery 200a from the power receiver 102a and inserts the battery 200a into a charging slot 311 (in this example, four slots 311a to 311d) of the charger 300. Meanwhile, the HMD 100 switches to the other battery 200b that is on standby and continues operating.

Also in the charging operation from the charger 300 to the battery 200a, power is supplied through the power transceiving coil. When the charging of the battery 200a is completed, it is notified through the indicator of the HMD 100 that the charging has been completed, so that the user takes out the battery 200a and mounts the battery 200a in the power receiver 102a of the HMD 100. In this manner, since a plurality of batteries are mounted in the HMD 100 and are alternately switched for use, the user can continue using the HMD 100. However, since a work for the replacement of the battery 200 with respect to the HMD 100 and a work for the insertion of the battery 200 into the charger 300 are performed in a state in which the user wears the HMD 100, the following measures are taken.

In the HMD 100, an infrared sensor 115a is provided right behind the power receiver 102a, in which the battery 200 is mounted, so as to face the outside of the temple unit. In addition, in the power receiver 102b on the opposite side, an infrared sensor 115b is similarly provided. When the user removes the battery 200a mounted in the power receiver 102a, the user can easily remove the battery 200a by inserting a finger into the recess at the rear end of the power receiver 102a. At that time, the infrared sensor 115a near the rear end of the power receiver 102a detects that a hand approaches to remove the battery 200a. If the user mistakenly tries to remove the battery 200b (right eye side) on the opposite side instead of the battery 200a (left eye side), the infrared sensor 115b provided near the power receiver 102b on the right eye side detects the approach of the user's hand and gives a warning that the battery to be replaced now is not the battery on the right eye side but a battery on the left eye side, so that it is possible to prevent a user's erroneous operation.

Then, the user inserts the removed battery 200a into any of the plurality of charging slots 311a to 311d of the charger 300. Slot number portions 312a to 312d corresponding to the respective charging slots have protruding structures in the form of numbers, so that the user can recognize the slot number or the direction of the charger by touching with a finger. In addition, in the slot number portion 312, a red LED lights up when the charging of the battery is started, and a green LED lights up when the charging is completed. The same applies to the battery 200 inserted into the charging slot 311. A red LED 215 lights up when the charging is started, and a green LED 215 lights up when the charging is completed.

In addition, the glasses-type HMD 100 can be mounted on and detached from the head by expanding the temple unit. Strain sensors 116a and 116b are provided at the end of the temple unit on the indicator side. The strain sensors 116a and 116b detect the spread when the HMD is mounted, so that detach from the head can be seen. If there are no changes in the detection signals of the strain sensors 116a and 116b for a predetermined time (for example, one minute), the HMD 100 automatically enters the standby mode. When the detection signals change again, the HMD operation is started. As a result, the power consumption of the HMD 100 can be reduced. A camera 120 and an infrared sensor 115c are provided on the front side of the HMD 100.

Next, the configurations of the HMD 100, the battery 200, and the charger 300 will be described.

FIG. 2 is a block diagram illustrating the internal configuration of the HMD 100. The HMD 100 includes a controller 101, a memory 105, a power supply manager 106, a sensor unit 107, a communication interface 108, a data output interface 109, and a data input interface 110. The controller 101 controls the entire operation of the HMD 100.

The memory 105 stores information of the internal state of the HMD 100 or information of the power storage state of the battery 200, and also stores image data displayed on the HMD. The power supply manager 106 includes a power receiver 102, a converter 103, and a limiter 104 for receiving power from the battery 200 in use, and supplies power to each unit inside the HMD 100. The power receiver 102 has a power receiving coil for receiving power wirelessly. In addition, the power supply manager 106 monitors the states of the battery 200 being used by the HMD 100, the battery 200 being charged by the charger 300, and the built-in battery. A frequency counter 121 detects that the battery 200 in use has been removed. Details of these operations will be described later.

The sensor unit 107 includes the infrared sensor 115 and the strain sensor 116, but may also include an acceleration sensor, a gyro sensor, a magnetic sensor, a temperature sensor, an electrostatic sensor, a tactile sensor, and the like as necessary. The communication interface 108 includes a wireless LAN or Bluetooth (registered trademark) for wireless communication with the battery 200 or the charger 300, and may have a 1seg function or a position information acquisition function using a global positioning system (GPS).

The data output interface 109 includes the display 119 for displaying videos or information provided to the user at the position of the lens unit of the glasses, a speaker (earphone) for outputting sound, a light emitting element, and the like. The data input interface 110 includes the camera 120 for imaging a landscape in front of the HMD 100, a microphone to which sound is input, an operation input unit to which an operation from the user is input, and the like.

Figure 3:
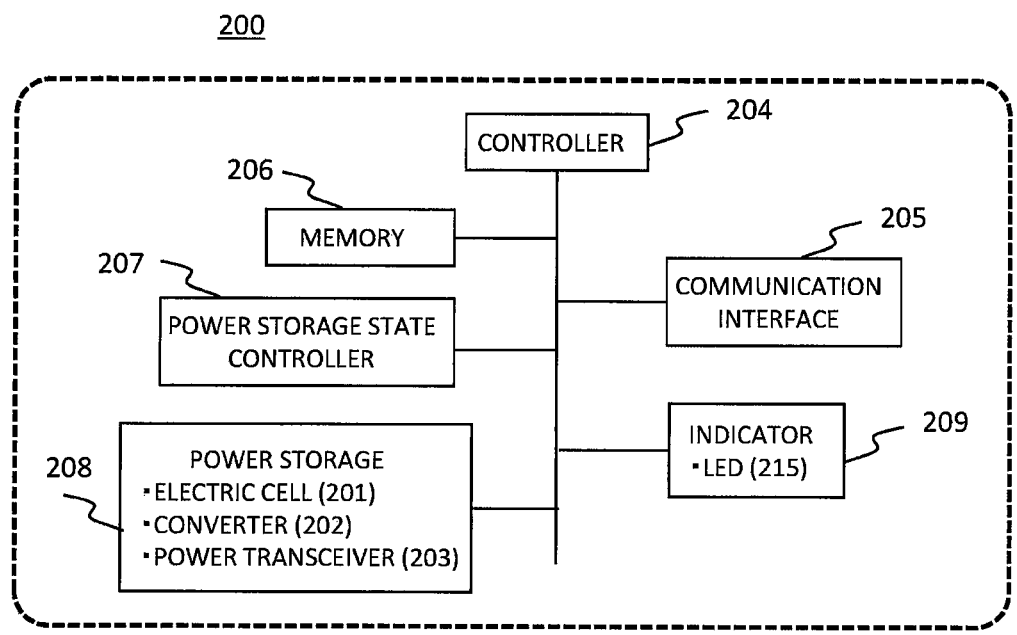
FIG. 3 is a block diagram illustrating the internal configuration of a battery 200.

FIG. 3 is a block diagram illustrating the internal configuration of the battery 200. The battery 200 includes a controller 204, a communication interface 205, a memory 206, a power storage state controller 207, a power storage 208, and an indicator 209. The controller 204 controls the overall operation of the battery 200.

The communication interface 205 includes a wireless LAN or Bluetooth (registered trademark) for wireless communication with the HMD 100 or the charger 300. The memory 206 can store information of the internal state of the battery 200, and can also store image data displayed on the HMD 100.

The power storage state controller 207 detects the remaining power storage amount or the charge amount of the battery and stores the information. The power storage 208 includes an electric cell 201 formed of a power storage device, a converter 202, and a power transceiver 203 for transmitting or receiving power to and from the HMD 100 or the charger 300. The power transceiver 203 has a power transceiving coil for wirelessly transmitting and receiving power. The indicator 209 is an LED 215 that displays the power storage amount of the battery in different colors.

In addition, in the following description, the battery 200 will be referred to as 200a to 200d (the same applies to the internal elements of the battery) depending on the use state (being used in the HMD and being charged by the charger).

Figure 4:
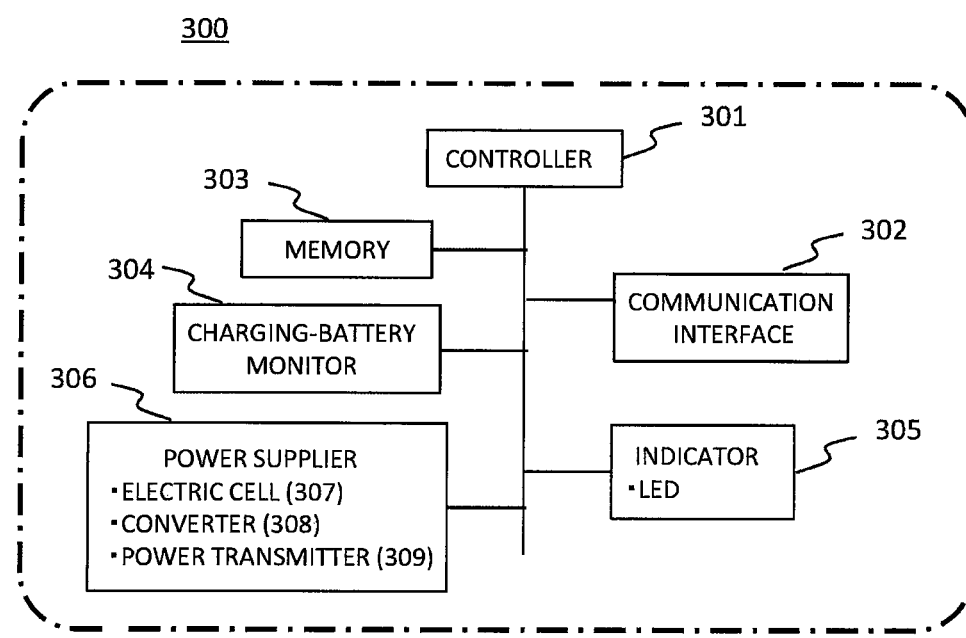
FIG. 4 is a block diagram illustrating the internal configuration of a charger 300.

FIG. 4 is a block diagram illustrating the internal configuration of the charger 300. The charger 300 includes a controller 301, a communication interface 302, a memory 303, a charging-battery monitor 304, an indicator 305, and a power supplier 306. The controller 301 controls the overall operation of the charger 300.

The communication interface 302 includes a wireless LAN or Bluetooth (registered trademark) for wireless communication with the HMD 100 or the battery 200. In addition, the communication interface 302 may have a 1seg function or a position information acquisition function using a GPS.

The memory 303 can store information of the internal state of the charger 300 or information of the power storage state of the battery 200, and can also store image data displayed on the HMD 100.

The charging-battery monitor 304 acquires information of the charge amount of the battery 200 being charged. The indicator 305 is an LED that displays the start and completion of battery charging in different colors.

The power supplier 306 includes an electric cell 307 for supplying power to the battery 200, a converter 308, and a power transmitter 309. The power transmitter 309 has a power transmission coil for wirelessly transmitting power. In addition, the indicator 305 and the power supplier 306 are provided as many as the charging slots 311.

Here, the electric cell 307 of the power supplier 306 can be charged by an external power supply. In addition, an external power supply is used in combination according to the use state of the HMD 100. For example, in the case of sitting at one place and using the HMD 100 for a long time such as watching a movie, the power supplier 306 is used by being connected to an external power supply, such as a commercial power supply. On the other hand, in the case of carrying around the HMD 100, the battery 200 of the HMD is charged by the charged electric cell 307.

In addition, in FIGS. 2 to 4, the power transmitter/power receiver includes a power transmission coil/power receiving coil, and the communication interface includes an antenna, but these are omitted in the diagrams for simplification.

Figure 5A:
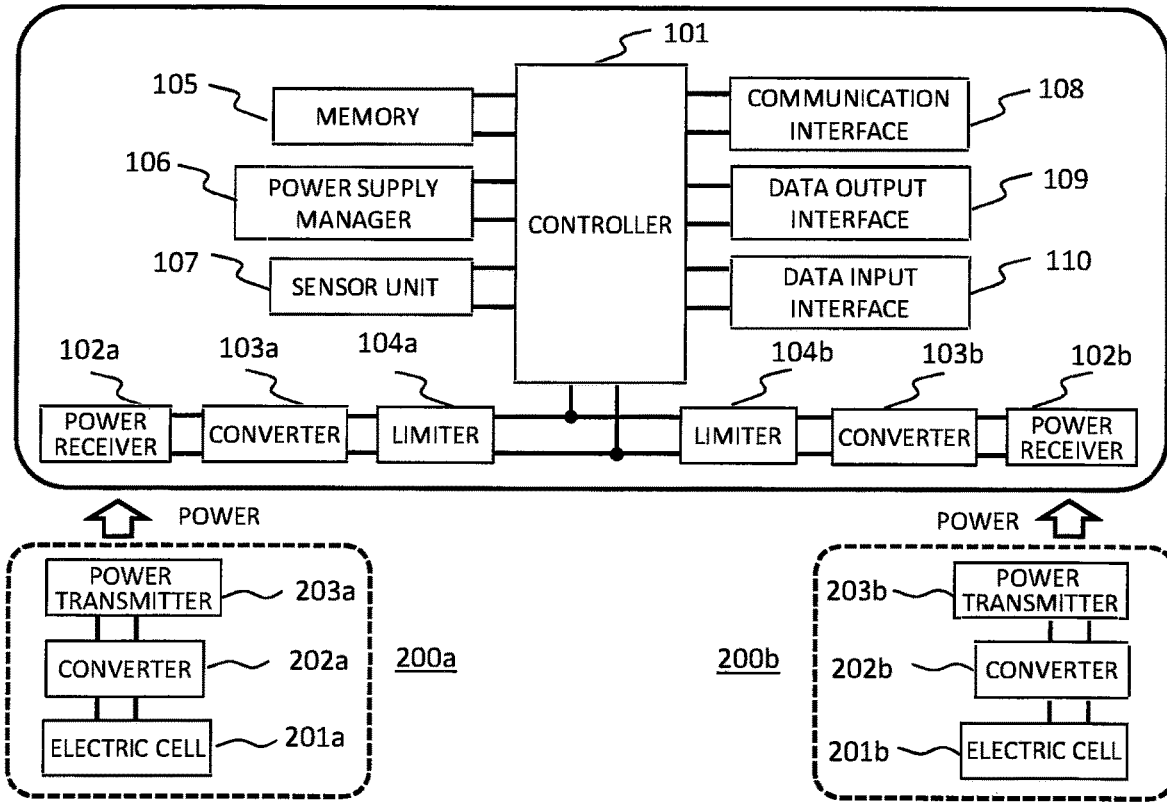
FIG. 5A is a diagram illustrating power transfer between the HMD 100 and batteries 200a and 200b in use.
Figure 5B:
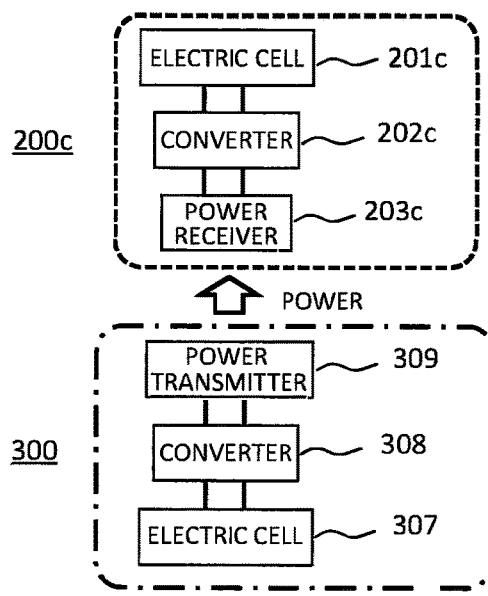
FIG. 5B is a diagram illustrating power transfer between a battery 200c being charged and the charger 300.

FIGS. 5A and 5B are diagrams describing power transfer between the HMD 100, the battery 200, and the charger 300. FIG. 5A illustrates power transfer between the HMD 100 and the batteries 200a and 200b in use, and FIG. 5B illustrates power transfer between the battery 200c being charged and the charger 300.

In FIG. 5A, a plurality of (here, two) batteries 200a and 200b can be mounted in the HMD 100, and power can be supplied from each of the batteries 200a and 200b. A DC current flows out from the electric cells 201a and 201b of the battery and is converted into an AC current having, for example, 150 kHz by the converters 202a and 202b. Then, power is wirelessly transmitted from the power transmitters 203a and 203b (power transmission coils) to the HMD 100.

The HMD 100 has a plurality of power receivers 102a and 102b (power receiving coils), and the power receivers 102a and 102b receive power wirelessly transmitted from the batteries 200a and 200b at, for example, 150 kHz. The converters 103a and 103b convert the received AC current into a predetermined DC current. The limiters 104a and 104b supply a DC current to the controller 101, but limit the supplied power according to the power use state of the load in the HMD 100. Therefore, the controller 101 transmits a control signal for power limitation to the limiter 104 based on the power use state of the load, but this is omitted in the diagrams.

The use of the plurality of batteries 200a and 200b in the HMD 100 can be set by selecting a control sequence performed by the controller 101. For example, a battery with a small remaining power storage amount is preferentially used. In addition, by allowing the power receivers 102a and 102b and the converters 103a and 103b to perform bidirectional power transfer and power conversion, one power receiver, for example, power receiver 102a, can always include the battery 200a mounted therein and the other power receiver 102b can be set for replacement only. As a result, a setting that the battery 200b mounted in the power receiver 102b supplies power required for operating the HMD 100 and stores power in the battery 200a is also possible. In this case, even when one hand cannot be used for some reason, it is possible to continue using the HMD 100 for a long time exceeding the use time with a single battery capacity while wearing the HMD 100.

As described above, by providing a plurality of batteries, another battery works as a power supply of the HMD 100 at the time of battery replacement. Therefore, the HMD can be continuously used even at the time of battery replacement. In addition, a built-in battery included in the power supply manager 106 of the HMD 100 can be used. The built-in battery has a smaller battery capacity than the batteries 200a and 200b to be mounted. However, by making the battery capacity sufficient to operate the HMD 100 during the battery replacement time, the HMD can be continuously used even at the time of battery replacement. On the other hand, when the battery is not replaced for a predetermined time, the HMD 100 itself is shut down for data preservation or the like.

FIG. 5B illustrates power transfer (charging operation) from the charger 300 to the battery 200c. In the power supplier 306 of the charger 300, a DC current generated from the electric cell 307 is converted into an AC current by the converter 308 and wirelessly transmitted from the power transmitter 309 (power transmission coil) to the battery 200c being charged. The power transmitted from the charger 300 is received by the power receiver 203c (power receiving coil) in the power storage 208 of the battery 200c, converted into a DC current by the converter 202c, and stored in the electric cell 201c.

Figure 6A:
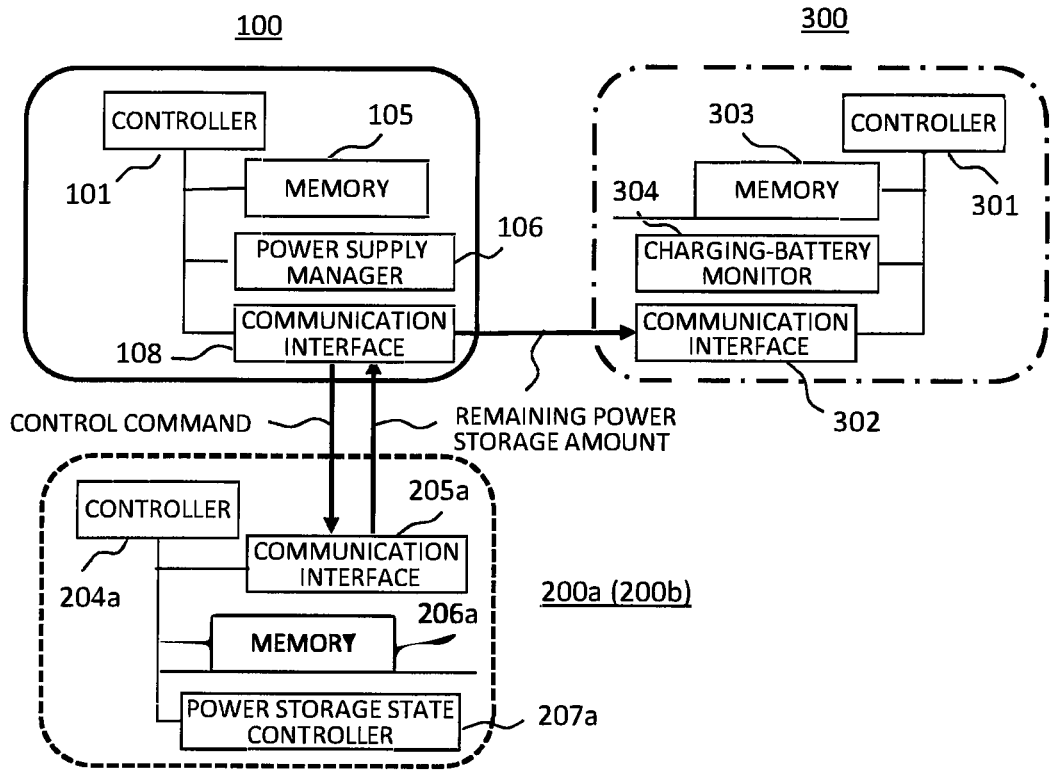
FIG. 6A is a diagram illustrating communication between the HMD, a battery in use, and a charger.
Figure 6B:
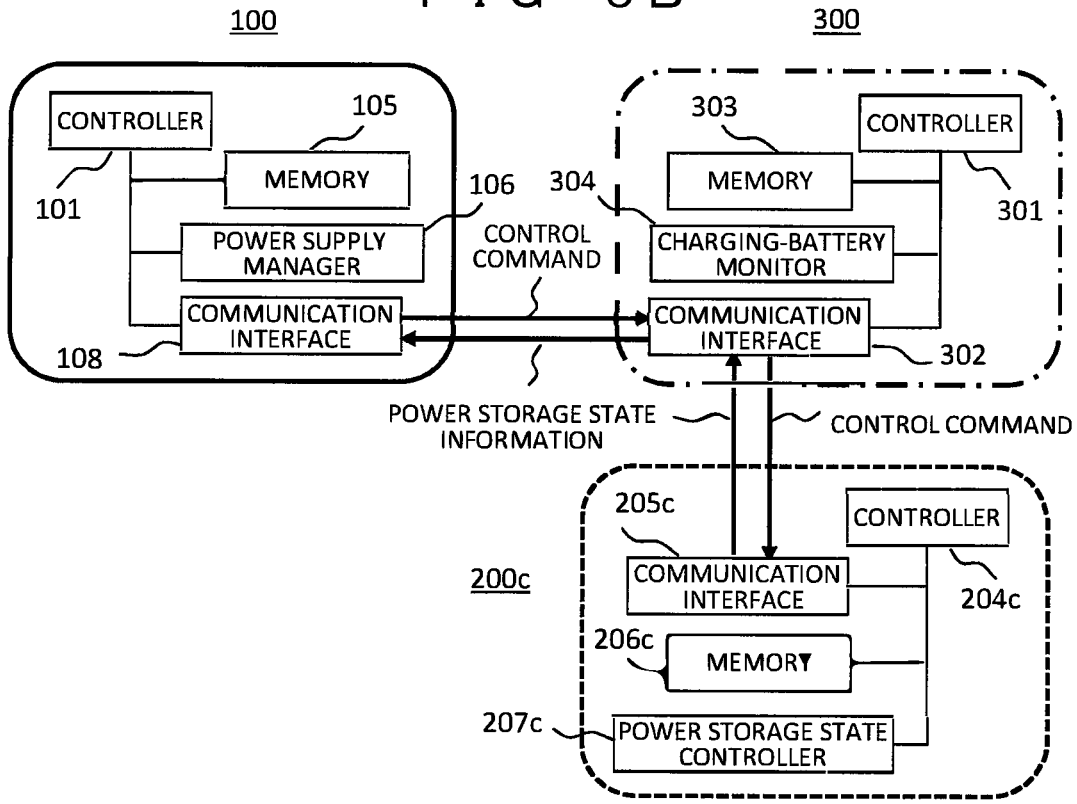
FIG. 6B is a diagram illustrating communication between the HMD, a battery being charged, and a charger.

FIGS. 6A and 6B are diagrams describing communication between the HMD 100, the battery 200, and the charger 300.

Of these, FIG. 6A illustrates communication regarding the battery 200a (200b) in use, and FIG. 6B illustrates communication regarding the battery 200c being charged.

In FIG. 6A, the communication interface 108 of the HMD 100 wirelessly communicates with the communication interface 205a of the battery 200a (200b) in use, so that the power supply manager 106 of the HMD 100 acquires the information of the remaining power storage amount of the battery obtained by the power storage state controller 207a of the batteries 200a and 200b in use. In addition, the communication interface 108 of the HMD 100 wirelessly communicates with the communication interface 302 of the charger 300 to transmit the information of the remaining power storage amount of the batteries 200a and 200b in use, which is obtained by the HMD 100. In addition, the communication interface 108 of the HMD 100 transmits a control command, such as stop of power transfer from the controller 101, to the batteries 200a and 200b in use based on the power use state of the load in the HMD 100.

In FIG. 6B, the communication interface 302 of the charger 300 wirelessly communicates with the communication interface 205c of the battery 200c being charged, so that the charging-battery monitor 304 of the charger 300 acquires the information (charge amount) of the power storage state of the battery 200c that is obtained by the power storage state controller 207 of the battery 200c. In addition, the communication interface 108 of the HMD 100 wirelessly communicates with the communication interface 302 of the charger 300, so that the power supply manager 106 of the HMD 100 acquires the information of the power storage state of the battery 200c being charged. In addition, the communication interface 108 of the HMD 100 transmits a control command, such as charging start/stop, from the controller 101 to the charger 300 based on the remaining power storage amount of the batteries 200a and 200b in use or the power use state of the load in the HMD 100, and the charger 300 controls the battery 200c being charged according to the control command.

In this manner, the HMD 100 and the charger 300 communicate to each other the remaining power storage amount of the batteries 200a and 200b in use or the power storage state information of the battery 200c being charged, and store the remaining power storage amount of the batteries 200a and 200b in use or the power storage state information of the battery 200c being charged in the respective memories 105 and 303.

Figure 7A:
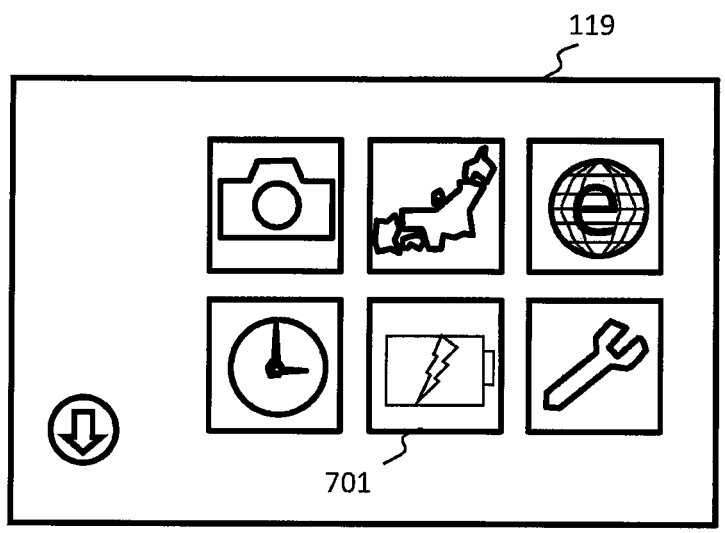
FIG. 7A is a diagram illustrating an example in which various function menus of the HMD are displayed on a display.
Figure 7B:
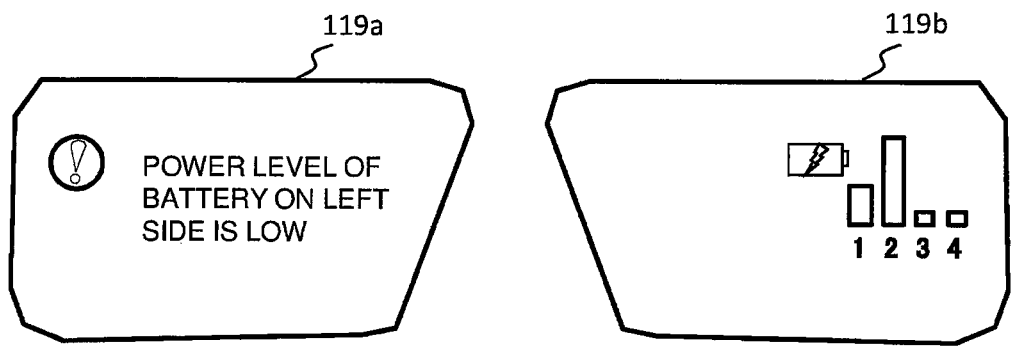
FIG. 7B is a diagram illustrating an example in which the status of a battery is displayed on the display.

FIGS. 7A and 7B illustrate display examples of the status of a battery on the display 119 of the HMD 100.

FIG. 7A is an example in which various function menus of the HMD are displayed on the display 119. The user selects a menu 701 regarding a battery from the menu palette. In order to check the battery status, the menu 701 is activated or kept active at all times.

FIG. 7B is an example in which the status of a battery is displayed on the display 119. A warning prompting battery replacement is displayed on a left display 119a, and information of the charge amount of the battery placed in each charging slot is displayed on a right display 119b. When the power level of the battery is low, a warning prompting battery replacement, such as "The power level of the battery on the left side is low", is automatically displayed on the left display 119a of the HMD 100. At this time, in order to eliminate the user's misunderstanding, the warning is displayed on the side of the battery with a low power level. When this is displayed, the user will have to replace the battery on the left side.

In addition, on the display 119b on the right side that is the opposite side at that time, the charge amount of the battery being charged in each slot is displayed by a bar. In this display example, it is illustrated that the charge amount of the battery of the slot number 2 is the maximum, and the number and the bar of the slot 2 are displayed so as to blink. At the same time, in the charger 300, the number 312b (number 2) of the battery charging slot 311b blinks in a green LED, and the LED of the battery 200 blinks in green. When this is displayed, the user may take out the battery being charged in the charging slot 311b and mount the battery in the HMD.

As described above, according to the configuration of the first embodiment, the user can supply power by replacing the battery while wearing the HMD 100, so that it is possible to continue using the HMD without interruption. Thus, when replacing a battery of a device, a case where the battery can be replaced while using the device is called "hot swappable". In addition, since the power transfer from the battery 200 to the HMD 100 and the power transfer from the charger 300 to the battery 200 are wireless power transfers over a short distance, necessary power can be easily transmitted. In addition, the battery 200 has a structure in which the metal terminals are not exposed to the outside. Therefore, even when the HMD is mounted on the user's head and used, there is no concern about corrosion of the terminals or short circuit between terminals during battery replacement due to sweat. As a result, safe use is possible. For example, even when a user watches a movie for a long time, the feeling of wearing is not adversely affected by increasing the number of batteries to be mounted, and there is no trouble of connecting a power supply cable from the terminal of the wearable device to the external power supply. Therefore, usability is improved.

Here, as a modification example of the first embodiment, a configuration for downloading a large amount of data from a cloud using the power supply system of the present embodiment will be described.

Figure 8:
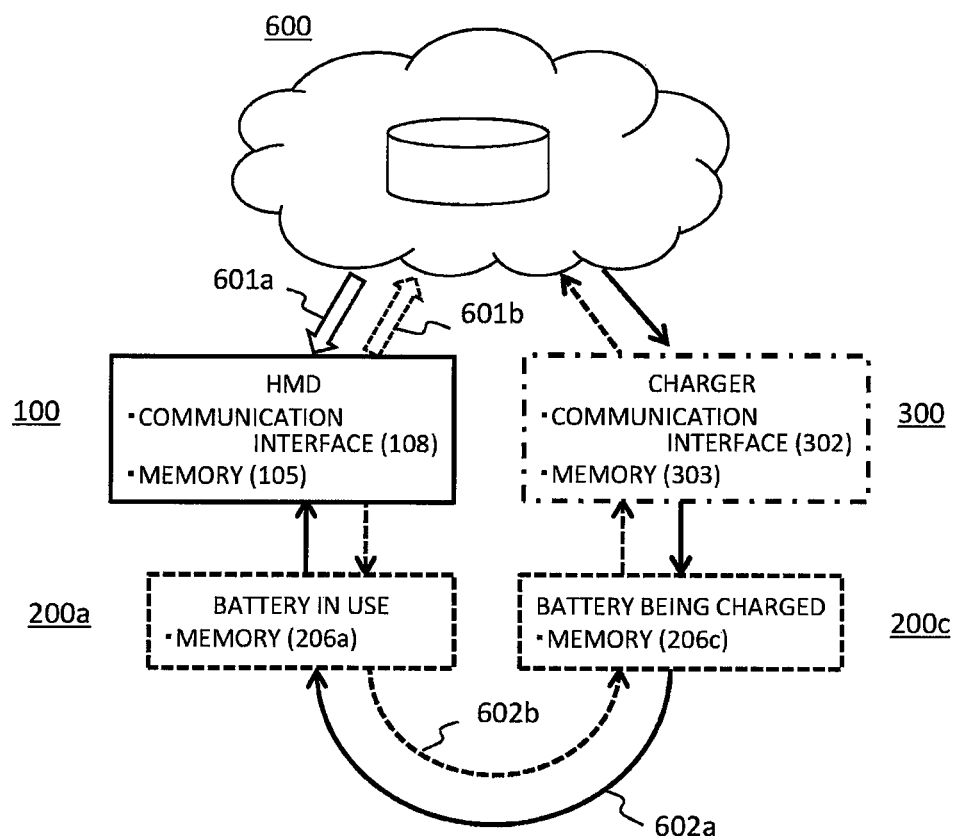
FIG. 8 is a diagram illustrating data transmission between a power supply system and a cloud.

FIG. 8 is a diagram illustrating data transmission between the power supply system of the present embodiment and a cloud 600. The power supply system includes the HMD 100, the battery 200a being used (mounted) in the HMD, the charger 300, and the battery 200c being charged by the charger.

For data transmission between the HMD 100 and the cloud 600, there are a case where image data or the like is downloaded from the cloud 600 and viewed on the HMD 100 (reference numeral 601a) and a case where image data acquired by the data input interface 110 (camera 120) of the HMD 100 is uploaded to the cloud 600 (reference numeral 601b). In either case, since the data is directly transmitted between the HMD 100 and the cloud 600, it takes time to transmit a large amount of data, such as a movie, and there is a concern that the battery capacity may be insufficient. Therefore, in the configuration of the present embodiment, data transmission is performed through the battery 200 being charged by using the charging time.

The communication interface 302 of the charger 300 downloads data from the cloud 600 and stores the data in the memory 206c of the battery 200c being charged. When using the charged battery 200c in the HMD 100, the data stored in the memory 206a of the battery 200a in use is read and viewed (path indicated by reference numeral 602a). In addition, conversely, data generated by the HMD 100 is stored in the memory 206 of the battery 200a in use by using the memory 105 as a buffer. While this battery is being charged by the charger 300, the stored data is read from the memory 206c of the battery 200c and uploaded to the cloud 600 through the communication interface 302 of the charger 300 (path indicated by reference numeral 602b). As described above, the HMD 100 performs data transmission to and from the cloud 600 using the memory of the battery 200 being charged, so that there is an effect that a large amount of data can be efficiently transmitted.

Second Embodiment

In a second embodiment, a configuration for performing battery replacement of an HMD while using the HMD, that is, a hot swap function will be described.

Figure 9:
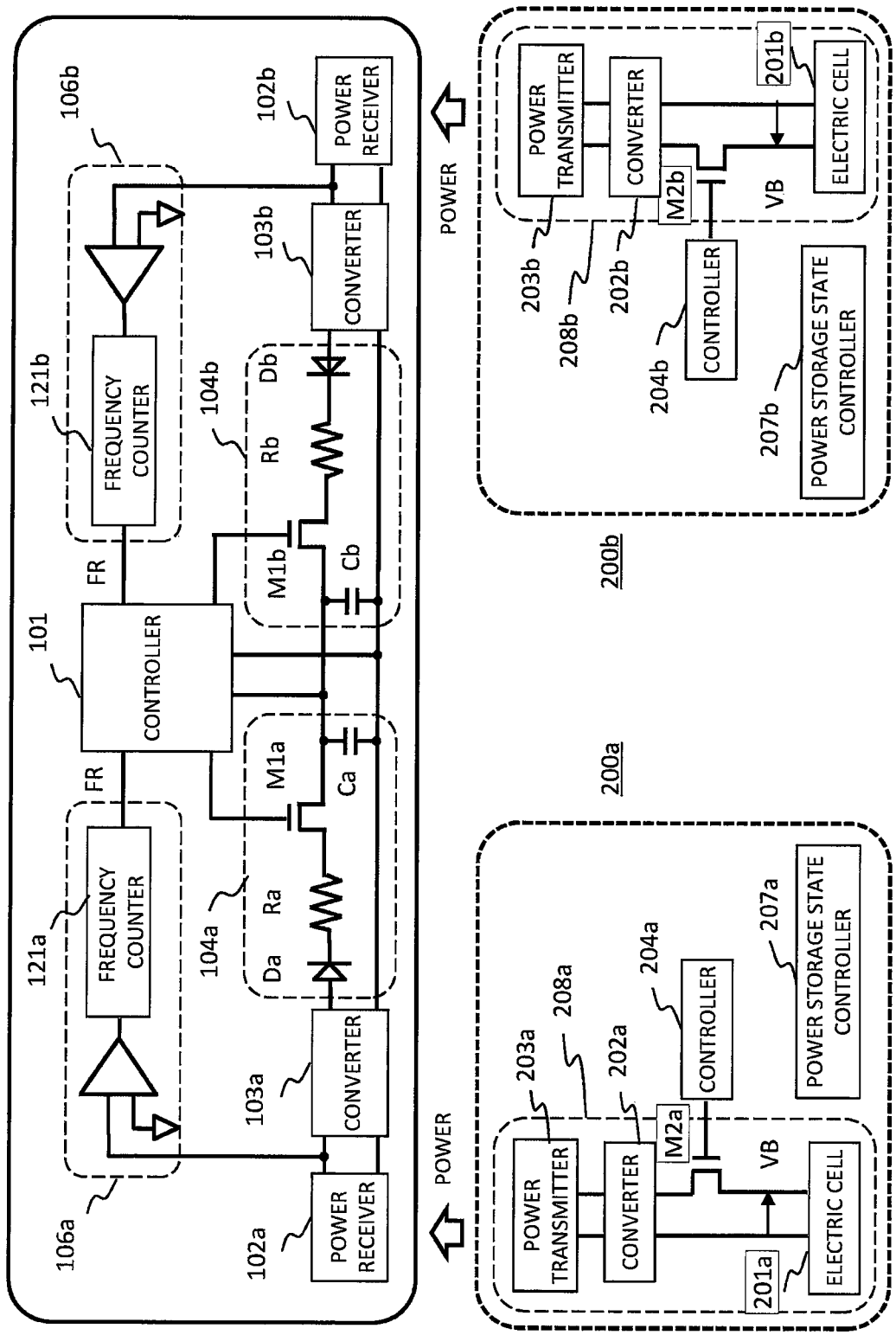
FIG. 9 is a diagram illustrating the control of power transfer between the HMD and a battery (second embodiment).

FIG. 9 is a diagram illustrating the control of power transfer between the HMD and the battery. A configuration for mounting a plurality of batteries 200a and 200b in the HMD 100 and performing switching therebetween is illustrated.

In the HMD 100, the limiters 104a and 104b have a backflow prevention diode D, a current detection resistor R, a MOS field effect transistor (MOSFET) M1, and a power storage capacitor C on the power lines supplied from the batteries 200a and 200b, respectively. The controller 101 cuts off the power received from the battery 200 by controlling ON/OFF of the MOSFET (M1).

In addition, the power supply managers 106a and 106b of the HMD 100 have an amplifier and frequency counters 121a and 121b to detect that the battery 200 has been removed from the HMD 100. When the battery 200 is removed, the resonance frequency for wireless power transfer in the power receivers 102a and 102b changes. Therefore, battery removal can be detected by monitoring the resonance frequency with the frequency counter 121.

On the other hand, in the batteries 200a and 200b, MOS field effect transistors (MOSFETs) M2a and M2b are provided between the electric cells 201a and 201b and the converters 202a and 202b in the power storages 208a and 208b. By controlling the MOSFET (M2) by the controllers 204a and 204b, the current flowing from the electric cells 201a and 201b to the converters 202a and 202b is limited. In addition, the remaining power storage amount of the battery 200 is determined by measuring the inter-terminal voltage VB of the electric cells 201a and 201b by the power storage state controllers 207a and 207b.

Hereinafter, a processing procedure when a battery being used in the HMD is replaced will be described.

Figure 10:
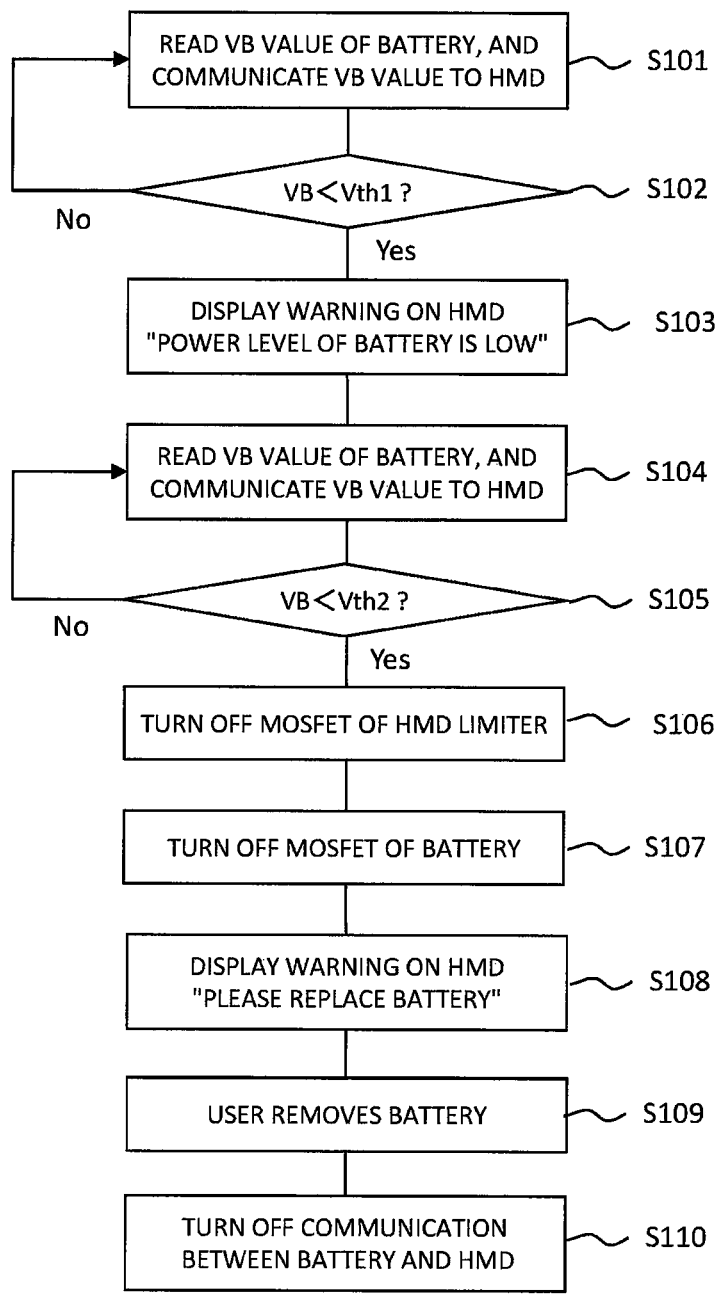
FIG. 10 is a flowchart illustrating a process of removing a battery in use from the HMD.

FIG. 10 is a flowchart illustrating a process of removing a battery in use from an HMD since the remaining power storage amount of the battery in use is insufficient.

The battery 200 in use reads the inter-terminal voltage VB (remaining power storage amount) of the electric cell 201 by the power storage state controller 207, and informs the HMD 100 by communication with the HMD 100 (S101). The HMD 100 compares the received voltage VB with a preset first threshold Vth1 (S102). If the voltage VB is higher than the threshold Vth1, the process returns to S101 since the battery can be continuously used. However, if the voltage VB becomes lower than the threshold Vth1, a warning such as "The power level of the battery is low" is displayed on the display 119 of the HMD 100 (S103). Specifically, as illustrated in FIG. 7B, the warning is displayed on the display 119a on the battery side where the remaining power storage amount is low.

When the battery 200 is further used, the battery 200 reads the inter-terminal voltage VB and communicates the inter-terminal voltage VB (S104), and the HMD 100 compares the received voltage VB with a preset second threshold Vth2

(where Vth2<Vth1) (S105). While the voltage VB is higher than the threshold Vth2, the process returns to S104 since the battery can be continuously used. However, when the voltage VB becomes smaller than the threshold Vth2, processing for removing the battery is performed.

The HMD 100 turns off the MOSFET (M1) of the limiter 104 (S106) to prevent a reverse current to the battery 200 side. In addition, the battery 200 in use is instructed to turn off the MOSFET (M2), so that the current flow from the electric cell 201 is stopped (S107). At this stage, a warning "Please replace the battery" is displayed on a side where a battery with a low remaining power storage amount is located on the display 119 of the HMD 100 (S108).

The user removes the battery 200 from the HMD 100 (S109), and the communication between the battery 200 and the HMD 100 is turned off (S110).

In addition, instead of the two thresholds Vth1 and Vth2, for example, one third threshold Vth3 having a margin of the remaining battery power of about 10% can be set for safety, so that the user can move on to the battery replacement work while there is enough battery power remaining.

Figure 11:
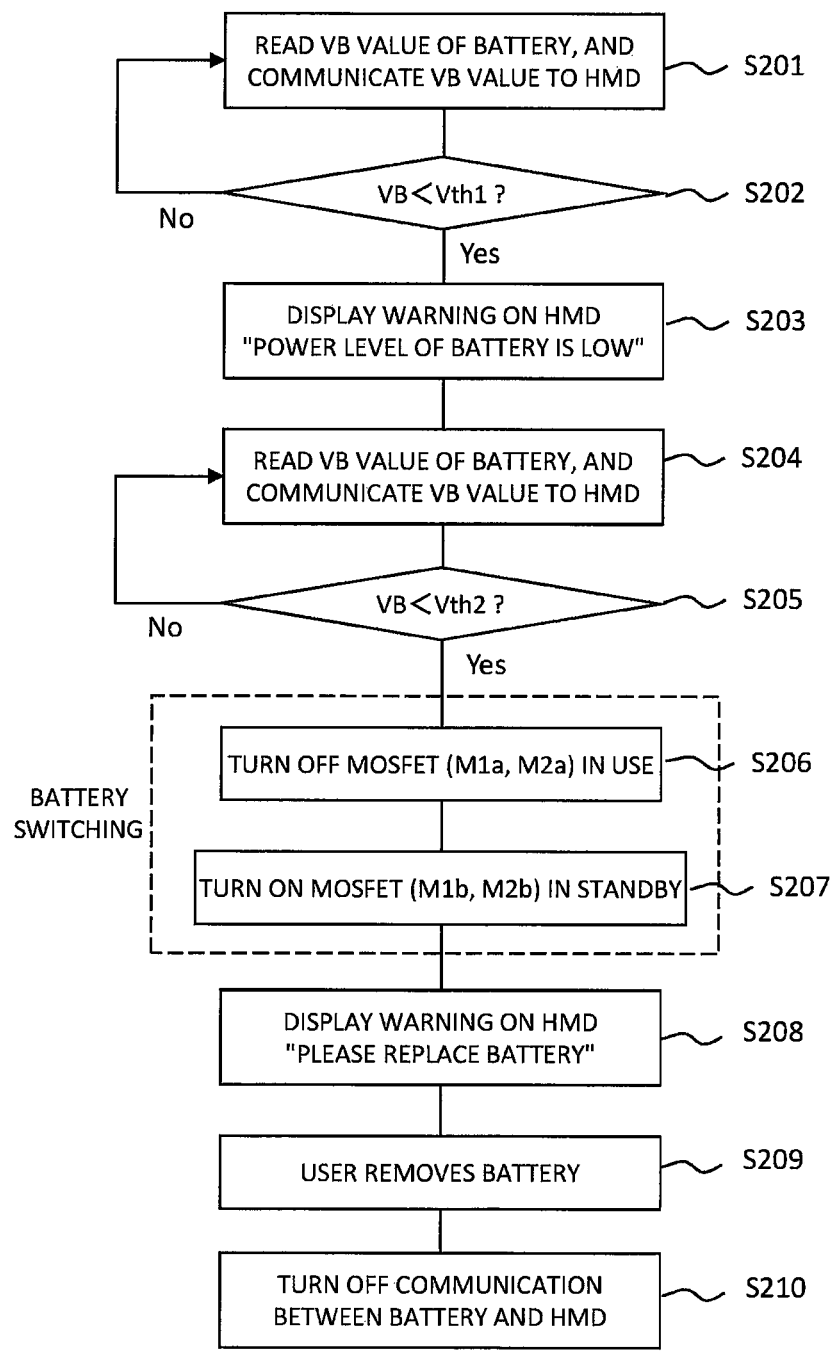
FIG. 11 is a flowchart illustrating a process of switching a battery in use to a battery in standby.

FIG. 11 is a flowchart illustrating a process of switching to a battery in standby since the remaining power storage amount of a battery in use is insufficient. Here, the case of switching from the left battery 200a to the right battery 200b will be described as an example.

Until the inter-terminal voltage VB (remaining power storage amount) of the electric cell 201a of the battery 200a in use is read and compared with the first threshold Vth1 and the second threshold Vth2 (S201 to S205), the process is the same as S101 to S105 in FIG. 10. If the voltage VB becomes smaller than the threshold Vth2 (Yes in S205), switching from the battery 200a to the battery 200b is performed.

First, the controller 101 of the HMD 100 turns off the MOSFET (M1a) of the limiter 104a on the side of the battery 200a in use and turns off the MOSFET (M2a) for the battery 200a in use to stop the current flow from the electric cell 201a (S206). Then, the controller 101 turns on the MOSFET (M1b) of the limiter 104b on the side of the battery 200b in standby and turns on the MOSFET (M2b) for the battery 200b in standby to start the current flow from the electric cell 201b (S207). As a result, the power receiving system is switched from the battery 200a to the battery 200b. During this switching, the power of the HMD 100 is supplied by the power stored in the capacitor Ca of the limiter 104a or the built-in battery of the HMD 100. Therefore, the operation of the HMD 100 is not interrupted by battery switching.

Thereafter, a warning "Please replace the battery" is displayed on the display 119a on the left side of the HMD 100 (S208). The user removes the battery 200a (S209), so that the communication between the battery 200a and the HMD 100 is turned off (S210).

Figure 12:
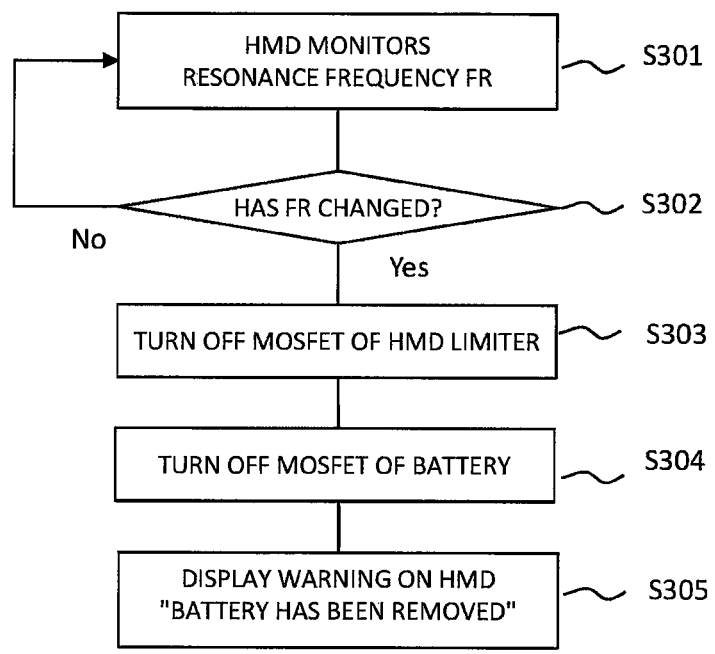
FIG. 12 is a flowchart illustrating a process when a battery is removed from the HMD.

FIG. 12 is a flowchart illustrating a process when a battery is removed from the HMD. A process of stopping the supply of power not only when a battery is replaced but also when a battery is removed for some reason.

In the HMD 100, the frequency counter 121 of the power supply manager 106 monitors a resonance frequency FR of the power receiver 102 (power receiving coil) (S301). When the battery 200 in use is removed from the power receiver 102 or is displaced from a predetermined position, the resonance frequency FR changes. When the frequency counter 121 detects this frequency change (Yes in S302), the controller 101 of the HMD 100 turns off the MOSFET (M1) of the limiter 104 (S303). In addition, the communication interface 108 of the HMD 100 communicates with the battery 200 to turn off the MOSFET (M2) of the battery 200, so that the current flow from the electric cell 201 is stopped (S304). At this stage, a warning "Battery has been removed" is displayed on a side where the removed battery is located on the display 119 of the HMD 100 (S305).

According to the second embodiment, when replacing the battery of the HMD 100, the user can continuously use the HMD 100 without the operation of the HMD 100 being interrupted. Therefore, the hot swap function can be realized.

Third Embodiment

In a third embodiment, the structure of the battery 200 suitable for being mounted in the HMD 100 or the charger 300 will be described.

Figure 13:
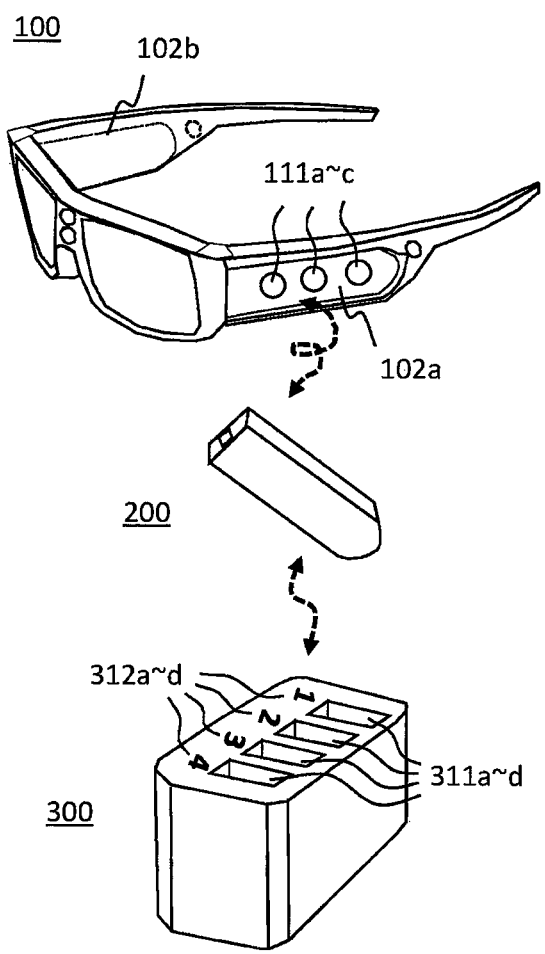
FIG. 13 is a diagram illustrating an operation of mounting a battery in the HMD and a charger (third embodiment).

FIG. 13 is a diagram illustrating an operation of mounting the battery 200 in the HMD 100 and the charger 300. In the HMD 100, a plurality of magnets 111a, 111b, and 111c are attached to the battery mounting surface of the power receiver 102. Although a plurality of magnets are attached herein, the number of magnets may be one. In addition, the battery 200 has a ferrite with the same shape attached thereto. These magnets and ferrites are for reducing magnetic field leakage and aligning the power transceiving coils between the HMD 100 and the battery 200. On the other hand, also in the charger 300, a magnet having the same shape is attached to reduce magnetic field leakage and align the power transceiving coils between the charger 300 and the battery 200.

Figure 14:
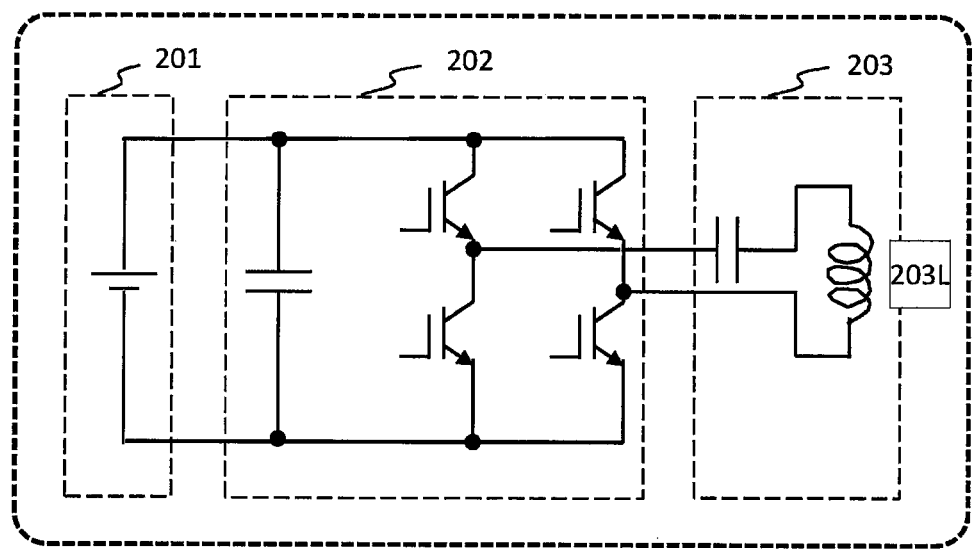
FIG. 14 is a diagram illustrating an example of a power system circuit in a battery.

FIG. 14 is a diagram illustrating an example of a power system circuit in the battery 200. The battery 200 includes the electric cell 201, the converter 202, and the power transceiver 203. The converter 202 is a bidirectional converter for DC/AC conversion, and a coil 203L in the power transceiver 203 can be used for both power transfer and power reception. Hereinafter, the structure of the battery will be described in detail.

FIG. 15 is a diagram illustrating an example of the internal structure of the battery 200, where (a) is a perspective view of the upper lid of a case 214 and (b) is a cross-sectional view taken along the line α-α'. As illustrated in (b), for example, in the case 214 formed of resin, the electric cell 201, an electronic board 213, and a ferrite plate 211 are provided, and ferrite cylinders 212a, 212b, and 212c and the coil 203L are mounted on the ferrite plate 211.

FIG. 16 is a diagram illustrating a state when the battery 200 is mounted in the HMD 100. (a) is a diagram in which a battery is mounted in the HMD, and (b) and (c) are cross-sectional views taken along the line β-β'. The temple unit 114 of the HMD 100 has a shape that entirely covers the upper and lower surfaces of the case 214 of the battery in (b), but has a shape that holds a part of the lower portion of the case 214 in (c). Even in the case of (c), the ferrites 212 and 211 of the battery 200 are attracted by the magnet 111 of the HMD 100, so that the battery 200 can be fixed.

In (b) or (c), in the power receiver 102 of the HMD 100, the magnet 111 is disposed on the ferrite plate 113 together with a coil 102L. By the magnet 111 and the ferrite cylinder 212 of the battery 200, the coil 102L of the HMD 100 and the coil 203L of the battery 200 can be aligned. In addition, at the time of power transfer, the magnetic field generated by the coil 203L passes through the ferrite plates 211 and 113, the magnet 111, and the ferrite cylinder 212. Therefore, it is possible to reduce magnetic field leakage.

FIG. 17 is a diagram illustrating another example of the internal structure of the battery 200, where (a) is a perspective view of the upper lid of the case 214 and (b) is a cross-sectional view taken along the line α-α'. In this example, two sets of coils 203L and ferrites 211 and 212 are provided on both sides of the case 214 of the battery 200. When mounting the battery 200, the coil 203L and the ferrites 211 and 212 closer to the power receiver 102 of the HMD 100 can be used. Therefore, the user can mount the battery 200 without worrying about the mounting side.

FIG. 18 is a diagram illustrating a modification example of FIG. 17. In this example, the ends of two sets of coils 203L disposed on both sides inside the case 214 are connected to form one coil. In other words, one coil is bent approximately in the middle and is disposed on both sides inside the case 214. Also in this case, since the battery 200 has a symmetrical structure, the battery 200 can be easily mounted in the HMD 100 and placed in the charger 300.

Figure 19:
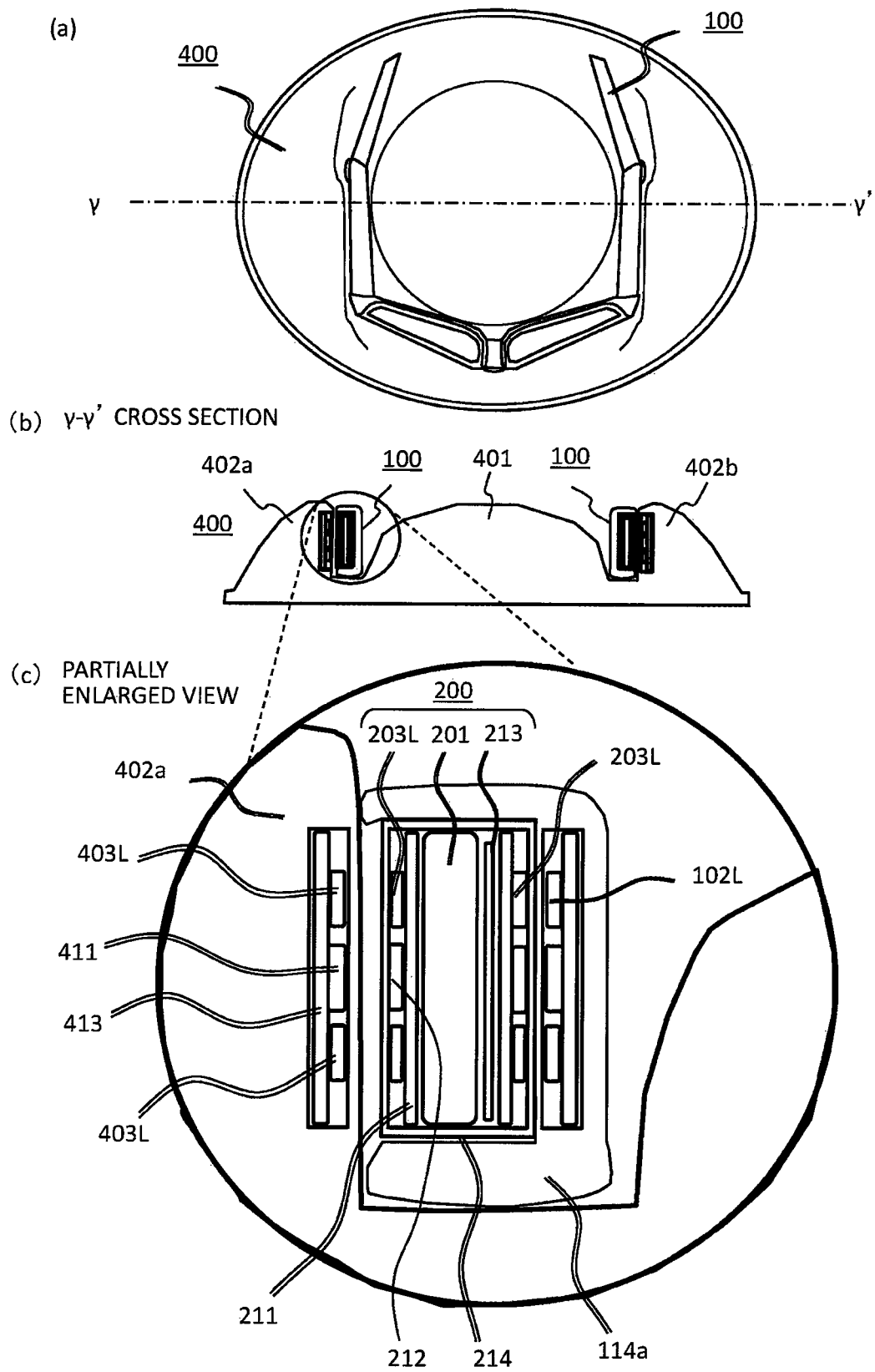
FIG. 19 is a diagram illustrating the configuration of a charger 400 for charging a battery mounted in the HMD.

FIG. 19 is a diagram illustrating the configuration of a charger 400 for charging the battery 200 mounted in the HMD 100. The operation of the charger 400 is the same as that of the charger 300 in the first embodiment, but this diagram is for describing the structure of a charging unit, and other components such as an electronic board in the charger are omitted. Here, a state is illustrated in which the battery 200 has the structure of FIG. 17 and the HMD 100 having the battery 200 mounted therein is placed in the charger 400. The cross-sectional shape of the temple unit 114 of the HMD 100 is the case of FIG. 16(b). (a) is a view from above, (b) is a cross-sectional view taken along the line γ-γ', and (c) is a partially enlarged view.

The shape of the charger 400 has a raised portion 401 in the middle and charging units 402a and 402b raised on both sides thereof, and the temple unit 114 of the HMD 100 is housed between the raised portion 401 and the charging units 402a and 402b. As illustrated in the enlarged view (c), on the inner wall of the charging unit 402a, a power transmission coil 403L for battery charging and a magnet 411 are disposed on a ferrite plate 413.

In the battery 200 mounted in the temple unit 114 of the HMD 100, the coil 203L on the left side of the diagram faces the coil 403L of the charger 400. The coil 203L of the battery 200 is a coil for both power transmission and reception, and the battery 200 can be charged from the coil 403L of the charger 400. In addition, by the attractive force between the magnet 411 of the charger 400 and the ferrite cylinder 212 of the battery 200, the coil 403L of the charger 400 and the coil 203L of the battery 200 are automatically aligned, so that sufficient power transfer efficiency is always obtained. In addition, at the time of power transfer, the magnetic field generated by the coil 403L passes through the ferrite plates 413 and 211, the ferrite cylinder 212, and the magnet 411, so that the magnetic field leakage can be reduced. For example, the battery 200 is charged simply by placing the HMD 100 in the charger 400 overnight. In addition, with the configuration illustrated in FIG. 8, required data such as a movie can be downloaded from the cloud 600.

According to the configuration of the third embodiment, since the battery 200 can be easily mounted in the HMD 100 and the charger 300, the power transfer efficiency is improved. In addition, according to the configuration illustrated in FIG. 19, it is possible to easily charge the battery 200 mounted in the HMD 100.

Fourth Embodiment

In a fourth embodiment, a configuration will be described in which power can be directly supplied to the HMD from not only a battery but also a charger.

FIG. 20A is a diagram illustrating the configuration of a power supply system according to the fourth embodiment, in which power can be supplied from a battery and a charger to the HMD. In this example, the flow of power when power is supplied from the two batteries 200a and 200b to the HMD 100 and power is supplied from two chargers 500a and 500b other than the batteries is illustrated. Although two chargers are used herein, the number of chargers is arbitrary, and a plurality of chargers may be integrated.

In the batteries 200a and 200b, a DC current flows out from the electric cell 201 and is converted into an AC current by the converter 202, so that power is wirelessly transmitted from the power transmitters 203a and 203b to the HMD 100 at, for example, 150 kHz. This is similar to the operation of FIG. 5A. On the other hand, each of chargers 500c and 500d also includes an electric cell 501, a converter 502, and a power transmitter 503, and similarly, power is wirelessly transmitted from the power transmitter 503 to the HMD 100.

The HMD 100 has four power receivers 102a, 102b, 102c, and 102d, and uses the power receiving system of the power receivers 102a and 102b from the batteries 200a and 200b and the power receiving system of the power receivers 102c and 102d from the charger 500. In each power receiving system, after power is received by the power receiver 102, the power is converted into a predetermined DC current by the converter 103, and the power is limited by the limiter 104 based on the power use state of the load, such as the communication interface 108 controlled by the controller 101. In addition, by allowing the converter 103 and the power receiver 102 to perform bidirectional power conversion and power transfer, the batteries 200a and 200b can be charged with the power supplied from the chargers 500c and 500d.

Figure 20B:
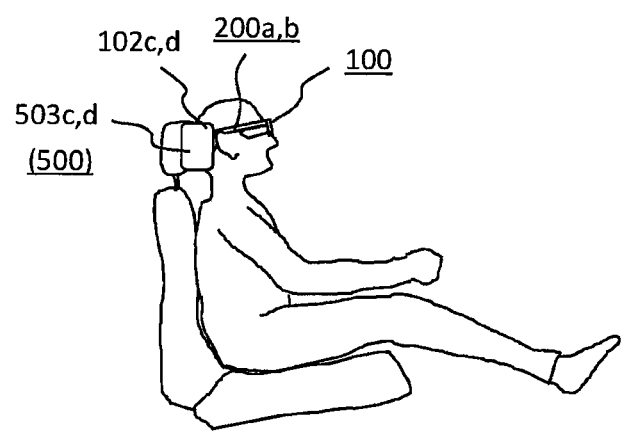
FIG. 20B is a diagram illustrating a specific application example of the power supply system illustrated in FIG. 20A.

FIG. 20B is a diagram illustrating a specific application example of the power supply system illustrated in FIG. 20A. This is an example in which a driver is using the HMD. The batteries 200a and 200b are mounted in the temple unit of the HMD. On the other hand, the power transmitters 503c and 503d of the chargers 500c and 500d are disposed in, for example, a headrest of a seat. The power receivers 102c and 102d of the HMD 100 that receive power from the power transmitters 503c and 503d are disposed on the right and left sides of a temple unit near the headrest, for example, a modern portion. While the driver is seated in the seat, power supplied from the charger 500 is preferentially used, and the battery 200 can be charged. Once the driver leaves the seat, switching to the supply of power from the battery 200 is performed.

According to the configuration of the fourth embodiment, it is possible to continue using the HMD with a single battery for a long time exceeding the use time of the battery capacity while wearing the HMD.

In each of the embodiments described above, the configuration of power supply has been described by taking the glasses-type head mounted display (HMD). However, the present invention is not limited thereto, and it is needless to say that the present invention can be similarly applied to other wearable devices.

REFERENCE SIGNS LIST

100 Head mounted display (HMD)
101 Controller
102 Power receiver
102L Coil
103 Converter
104 Limiter 105 Memory
106 Power supply manager
107 Sensor unit
108 Communication interface
109 Data output interface
110 Data input interface
111 Magnet
113 Ferrite plate
114 Temple unit
115 Infrared sensor
116 Strain sensor
119 Display
120 Camera
121 Frequency counter
200 Battery
201 Electric cell
202 Converter
203 Power transceiver
203L Coil
204 Controller
205 Communication interface
206 Memory
207 Power storage state controller
208 Power storage
209 Indicator
211 Ferrite plate
212 Ferrite cylinder
213 Electronic board
214 Case
215 LED
300 Charger
301 Controller
302 Communication interface
303 Memory
304 Charging-battery monitor
305 Indicator
306 Power supplier
307 Electric cell
308 Converter
309 Power transmitter
311 Battery charging slot
312 Slot number portion
400 Charger
401 Raised portion
402 Charging unit
403L Coil
411 Magnet
413 Ferrite plate
500 Charger
600 Cloud

The invention claimed is:

1. A wearable device worn on a user's body, comprising:
a plurality of power receivers in which at least first and second batteries are mounted, the plurality of power receivers wirelessly receiving power from the first and second batteries;
a power supply manager that monitors states of the mounted first and second batteries;
a communication interface that wirelessly communicates with the mounted first and second batteries;
a display that provides information to a user;
a plurality of limiters that limit the power received by the plurality of power receivers; and
a controller that controls the plurality of power receivers, the power supply manager, the communication interface, the display, and the limiters, wherein the power supply manager acquires information of remaining power storage amounts of the mounted first and second batteries through the communication interface, and displays the acquired information of the remaining power storage amounts on the display, and the controller causes the limiters to limit supply power based on a power use state of a load in the wearable device or the information of remaining power storage amounts of the first and second batteries.

2. The wearable device according to claim 1, wherein when the power supply manager determines that a remaining power storage amount of the first battery in use is smaller than a threshold, the power supply manager switches a power receiving system from the first battery in use to the second battery in standby and displays, on the display, a warning prompting the user to replace the first battery in use.

3. The wearable device according to claim 2, wherein the power supply manager includes a frequency counter that monitors a resonance frequency between a coil and the first battery in use in one of the plurality of power receivers, and wherein when the resonance frequency monitored by the frequency counter changes, the controller determines that the first battery in use has been removed from the one of the plurality of power receivers and displays a warning, which is for notifying the user that the first battery in use has been removed, on the display.

4. The wearable device according to claim 3, wherein, when it is determined that the remaining power storage amount of the first battery in use is smaller than a threshold or when it is determined that the first battery in use has been removed from the power receiver, the controller transmits a control command to the first battery in use through the communication interface to stop power transfer to the wearable device.

5. The wearable device according to claim 2, wherein, when it is determined that the remaining power storage amount of the first battery in use is smaller than a threshold or when it is determined that the first battery in use has been removed from the power receiver, the controller transmits a control command to the first battery in use through the communication interface to stop power transfer to the wearable device.

6. The wearable device according to claim 2, further comprising:

a first sensor that detects approaching object to near the first battery; and a second sensor that detects approaching object to near the second battery, wherein when the second sensor detects the approaching object, the controller displays a warning that prompts the user not to remove the second battery in standby, on the display.

7. The wearable device according to claim 1, wherein the power supply manager includes a frequency counter that monitors a resonance frequency between a coil and the first battery in use in one of the plurality of power receivers, and wherein when the resonance frequency monitored by the frequency counter changes, the controller determines that the first battery in use has been removed from the one of the plurality of power receivers and displays a warning, which is for notifying the user that the first battery in use has been removed, on the display.

8. The wearable device according to claim 7,
wherein, when it is determined that the remaining power storage amount of the first battery in use is smaller than a threshold or when it is determined that the first battery in use has been removed from the power receiver, the controller transmits a control command to the first battery in use through the communication interface to stop power transfer to the wearable device.

9. The wearable device according to claim 1,
wherein the communication interface further wirelessly communicates wireless communication with a charger that performs a charging operation on a third battery,
wherein power storage state information of the third battery being charged is acquired from the charger, and the acquired power storage state information is displayed on the display, and
wherein the controller transmits a control command of the charging operation on the third battery being charged to the charger through the communication interface.

10. The wearable device according to claim 1, wherein the power supply manager compares a remaining power storage amount of the first battery to a remaining power storage amount of the second battery, and controls one of the limiters to limit supply power to one of the first and second batteries that has the remaining power storage amount greater than the other.

11. The wearable device according to claim 1, further comprising an external power receiver that wirelessly receives power from an external charger,
wherein the mounted first and second batteries are charged using the power from the external power receiver.

12. A battery that is mounted in a wearable device to supply power and is chargeable by a charger, the battery comprising:
an electric cell that stores power;
a power transceiver that wirelessly transmits power from the electric cell to the wearable device and wirelessly receives power from the charger to charge the electric cell;
a converter that is disposed between the electric cell and the power transceiver and performs conversion between a DC current and an AC current;
a power storage state controller that detects and stores a remaining power storage amount or power storage state information of the electric cell;
a communication interface that wirelessly communicates with the wearable device and the charger; and
a controller that controls the power transceiver, the power storage state controller, and the communication interface,
wherein the power storage state controller transmits information of the remaining power storage amount of the electric cell to the wearable device through the communication interface, and
wherein the controller stops power transfer from the electric cell to the wearable device when a control command is received from the wearable device through the communication interface.

13. A power supply system, comprising:
a wearable device;
a battery that supplies power to the wearable device; and
a charger that charges the battery,
wherein the wearable device includes:
a plurality of power receivers in which at least first and second batteries are mounted, the plurality of power receivers wirelessly receiving power from the first and second batteries;
a power supply manager that monitors states of the mounted first and second batteries and a state of a third battery being charged by the charger;
a communication interface that wirelessly communicates with the mounted first and second batteries and the charger; and
a display that provides information to a user,
each of the first to third batteries includes:
a first electric cell that stores power;
a power transceiver that wirelessly transmits power from the first electric cell to the wearable device and wirelessly receives power from the charger to charge the first electric cell;
a power storage state controller that detects and stores a remaining power storage amount or power storage state information during charging of the first electric cell; and
a communication interface that wirelessly communicates with the wearable device and the charger,
the charger includes:
a power transmitter that wirelessly transmits power to the third battery being charged;
a charging-battery monitor that acquires power storage state information of the third battery being charged; and
a communication interface that wirelessly communicates with the wearable device and the third battery, and
the wearable device displays, on the display, information of the remaining power storage amount acquired from each of the mounted first and second batteries and the power storage state information of the third battery being charged that is acquired from the charger, and when it is determined that the remaining power storage amount of the first battery in use is smaller than a threshold, the wearable device switches a power receiving system from the first battery in use to the second battery in standby and displays, on the display, a warning prompting the user to replace the first battery in use.

14. The power supply system according to claim 13,
wherein coils used for the power receivers of the wearable device, the power transceiver of the battery, and the power transmitter of the charger are disposed on a ferrite plate, and
wherein when the battery is mounted in the wearable device and the charger, positioning between the coils is performed by an attractive force between the ferrite plate and magnets disposed at opposite positions on a mounting surface.

15. The power supply system according to claim 13, wherein the coil used for the power transceiver of the battery is disposed on two opposite surfaces of a case of the battery, and in a state in which one surface of the case of the battery is mounted on the wearable device, the other surface of the case of the battery is mounted on the charger to enable an operation of charging the battery.

\* \* \* \* \*